(12) United States Patent
Crawford et al.

(10) Patent No.: US 11,364,449 B2
(45) Date of Patent: Jun. 21, 2022

(54) METHODS AND SYSTEMS FOR OPTIMIZING MECHANICAL VAPOR COMPRESSION AND/OR THERMAL VAPOR COMPRESSION WITHIN MULTIPLE-STAGE PROCESSES

(71) Applicant: Energy Integration, Inc., Boulder, CO (US)

(72) Inventors: Lynn Allen Crawford, Aurora, CO (US); William Bryan Schafer, III, Boulder, CO (US)

(73) Assignee: Energy Integration, Inc., Boulder, CO (US)

( * ) Notice: Subject to any disclaimer, the term of this patent is extended or adjusted under 35 U.S.C. 154(b) by 0 days.

(21) Appl. No.: 17/374,962

(22) Filed: Jul. 13, 2021

(65) Prior Publication Data
US 2022/0016542 A1    Jan. 20, 2022

Related U.S. Application Data

(60) Provisional application No. 63/052,202, filed on Jul. 15, 2020, provisional application No. 63/172,150, (Continued)

(51) Int. Cl.
*B01D 1/28* (2006.01)
*B01D 1/26* (2006.01)
(Continued)

(52) U.S. Cl.
CPC ......... *B01D 1/2887* (2013.01); *B01D 1/0058* (2013.01); *B01D 1/26* (2013.01);
(Continued)

(58) Field of Classification Search
CPC .... B01D 1/2884; B01D 1/2896; B01D 3/007; B01D 3/143; B01D 9/00; C07B 31/00;
(Continued)

(56) References Cited

U.S. PATENT DOCUMENTS

| 4,340,446 A | 7/1982 | Crawford |
| 4,422,903 A | 12/1983 | Messick et al. |

(Continued)

OTHER PUBLICATIONS

International Search Report and Written Opinion, PCT/US2021/041505, dated Oct. 21, 2021 citing only 'A' references and no 'X' or 'Y' references.

*Primary Examiner* — Brian A McCaig
(74) *Attorney, Agent, or Firm* — O'Connor & Company; Ryan P. O'Connor

(57) ABSTRACT

The present invention utilizes mechanical vapor compression and/or thermal vapor compression integrating compression loops across multiple process stages. A sequential network of compressors is utilized to increase the pressure and condensing temperature of the vapors within each process stage, as intra-vapor flow, and branching between process stages, as inter-vapor flow. Because the vapors available are shared among and between compressor stages, the number of compressors can be reduced, improving economics. Balancing vapor mass flow through incremental compressor stages which traverse multiple process stages by splitting vapors between compressor stages enables the overall vapor-compression system to be tailored to individual process energy requirements and to accommodate dynamic fluctuations in process conditions.

10 Claims, 10 Drawing Sheets

Related U.S. Application Data filed on Apr. 8, 2021, provisional application No. 63/172,151, filed on Apr. 8, 2021.

(51) Int. Cl.

| | | |
|---|---|---|
| *B01D 3/14* | (2006.01) | |
| *B01D 3/00* | (2006.01) | |
| *B01D 1/00* | (2006.01) | |
| *B01D 9/00* | (2006.01) | |
| *C07B 31/00* | (2006.01) | |
| *C07B 33/00* | (2006.01) | |
| *C07B 35/02* | (2006.01) | |
| *C07B 35/04* | (2006.01) | |
| *C07B 35/08* | (2006.01) | |
| *C07B 37/08* | (2006.01) | |
| *C07B 37/10* | (2006.01) | |
| *C10B 55/00* | (2006.01) | |
| *C10G 7/00* | (2006.01) | |
| *C10G 9/00* | (2006.01) | |
| *C10G 11/00* | (2006.01) | |
| *C10G 31/06* | (2006.01) | |
| *C10G 45/00* | (2006.01) | |
| *C10G 47/00* | (2006.01) | |
| *C10G 49/00* | (2006.01) | |
| *C10G 50/00* | (2006.01) | |
| *C10G 51/00* | (2006.01) | |
| *C10G 53/00* | (2006.01) | |
| *C10G 55/00* | (2006.01) | |
| *C10G 57/00* | (2006.01) | |
| *C10G 59/00* | (2006.01) | |
| *C10G 61/00* | (2006.01) | |
| *C10G 63/00* | (2006.01) | |
| *C10G 65/00* | (2006.01) | |
| *C10G 67/00* | (2006.01) | |
| *C10G 69/00* | (2006.01) | |

(52) U.S. Cl.
CPC ......... *B01D 1/2884* (2013.01); *B01D 1/2896* (2013.01); *B01D 3/007* (2013.01); *B01D 3/14* (2013.01); *B01D 3/143* (2013.01); *B01D 9/00* (2013.01); *C07B 31/00* (2013.01); *C07B 33/00* (2013.01); *C07B 35/02* (2013.01); *C07B 35/04* (2013.01); *C07B 35/08* (2013.01); *C07B 37/08* (2013.01); *C07B 37/10* (2013.01); *C10B 55/00* (2013.01); *C10G 7/00* (2013.01); *C10G 9/00* (2013.01); *C10G 11/00* (2013.01); *C10G 31/06* (2013.01); *C10G 45/00* (2013.01); *C10G 47/00* (2013.01); *C10G 49/00* (2013.01); *C10G 50/00* (2013.01); *C10G 51/00* (2013.01); *C10G 53/00* (2013.01); *C10G 55/00* (2013.01); *C10G 57/00* (2013.01); *C10G 59/00* (2013.01); *C10G 61/00* (2013.01); *C10G 63/00* (2013.01); *C10G 65/00* (2013.01); *C10G 67/00* (2013.01); *C10G 69/00* (2013.01); *Y02E 20/30* (2013.01)

(58) Field of Classification Search
CPC ......... C07B 33/00; C07B 35/02; C07B 35/04; C07B 35/08; C07B 37/08; C07B 37/10; C10B 55/00; C10G 7/00; C10G 9/00; C10G 31/06; C10G 45/00; C10G 47/00; C10G 49/00; C10G 50/00; C10G 53/00; C10G 55/00; C10G 57/00; C10G 59/00; C10G 61/00; C10G 63/00; C10G 65/00; C10G 67/00; C10G 69/00

See application file for complete search history.

(56) References Cited

U.S. PATENT DOCUMENTS

| | | |
|---|---|---|
| 4,536,258 A | 8/1985 | Huhta-Koivisto |
| 4,539,076 A | 9/1985 | Swain |
| 4,585,523 A | 4/1986 | Giddings |
| 4,617,270 A | 10/1986 | Anderson et al. |
| 4,645,569 A | 2/1987 | Akabane et al. |
| 4,692,218 A | 9/1987 | Houben et al. |
| 4,746,610 A | 5/1988 | Smith |
| 5,294,304 A | 3/1994 | Kano et al. |
| 5,772,850 A | 6/1998 | Morris |
| 7,257,945 B2 | 8/2007 | Kass et al. |
| 8,101,217 B2 | 1/2012 | Sovereign et al. |
| 8,101,808 B2 | 1/2012 | Evanko et al. |
| 8,114,255 B2 | 2/2012 | Vane et al. |
| 8,128,787 B2 | 3/2012 | Wynn et al. |
| 8,283,505 B2 | 10/2012 | Evanko et al. |
| 8,304,588 B2 | 11/2012 | Evanko et al. |
| 8,614,077 B2 | 2/2013 | Evanko et al. |
| 8,535,413 B2 | 11/2013 | Bryan et al. |
| 9,138,678 B2 | 9/2015 | Huang et al. |

US 11,364,449 B2

METHODS AND SYSTEMS FOR OPTIMIZING MECHANICAL VAPOR COMPRESSION AND/OR THERMAL VAPOR COMPRESSION WITHIN MULTIPLE-STAGE PROCESSES

PRIORITY DATA

This patent application is a non-provisional application claiming priority to U.S. Provisional Patent App. No. 63/052,202, filed on Jul. 15, 2020, and to U.S. Provisional Patent App. No. 63/172,150, filed on Apr. 8, 2021, and to U.S. Provisional Patent App. No. 63/172,151, filed on Apr. 8, 2021, each of which is hereby incorporated by reference herein.

FIELD OF THE INVENTION

The present invention generally relates to methods and systems for reducing carbon intensity associated with refineries and biorefineries.

BACKGROUND OF THE INVENTION

Industrial processes utilizing reaction, separation, and evaporation generally separate multicomponent mixtures into pure materials or specific mixtures. Common raw materials include fossil hydrocarbons and renewable bio-based natural substrates. The raw material is passed through a refining process where the crude mixture is generally separated, fractionated, reacted, and/or purified to produce finished products with specific qualities. Conventionally, a "refinery" utilizes fossil hydrocarbons (e.g., crude oil or coal) while a "biorefinery" utilizes biomass (e.g., lignocellulosic feedstocks).

A typical refining process utilizes liquid-vapor phase change to cause separation of complex mixtures. Large amounts of process heat are required to drive this endothermic phase change. The boiling-point differences in the processed materials are organized in refinery process stages to allow cascading heat from the highest-temperature process to the lowest-temperature process in order to allow reuse of the heat and a reduction in total process energy. The heat of vaporization is much larger than the heat required to move process flows without vaporization where only the sensible heat capacity of the mixtures must be considered. For this reason, the vaporization process stages have the greatest energy demand in the overall process.

Unrefined hydrocarbons from plant-based sources or petroleum-based fossil sources are a mixture of complex organic molecules with differing molecular structures and boiling points. There are aliphatic, olefinic, and aromatic sub-classifications of hydrocarbons as well as triglycerides and various other renewable feedstocks. Refining process stages separate mixtures into subcomponents or break complex longer molecules into smaller molecules and/or reform them into larger molecules. Refineries invariably produce a mixture requiring purification through further processing and separation. The refining process may utilize a reaction vessel for performing a chemical change, resulting in a mixture of products, followed by a separation process to purify the reaction products. A typical refining process employs more than one process stage, where each stage yields differing products with varied markets and uses. These multiple stages in processing are typically operated continuously with each process stage in concert with other continuous process stages, producing different valued products.

Refineries and other industrial processing plants often require fractionation for recovery and refinement of finished products. The plant process energy consumed in fractionation often constitutes the largest energy requirement in the production life cycle of such products. Standard practice in refining is for each process stage to operate independently, with thermal energy as heat applied to each stage and the produced vapors from the process finally passing into a condenser, which acts as an out-of-contact heat exchanger that reduces the temperature and pressure of a gas phase to the conditions required to achieve a phase change to liquid. Condensers typically transfer the heat of condensation of a vapor or gas to a liquid, such as cooling water provided by cooling towers, or to a cooling gas, such as the air in the atmosphere. Consequently, the heat applied to the feed stream of the process is eventually lost to a cooling medium in the condenser. Often, a multiple-process system will have multiple condensers. Each of these process stages requires energy, with the total process energy being the sum of the energy for all the process stages. Likewise, the latent heat lost in condensers is approximated by the sum of the process energy added to the individual stages.

Standard industry practice for optimization of multiple, continuous process stages involves cascading heat from one stage to another stage within a multi-stage process for the purpose of reducing the total process energy. The cascading method is accomplished by arranging the multiple stages such that heat can pass from the higher-temperature process stage to the lower-temperature process stage as multiple effects. This approach reduces total process energy, but there is a renewed effort to bring process energy requirements to even lower energy levels to improve efficiency and reduce carbon footprint.

Vapor compression can be applied to process stages to reduce the total process energy below what is achievable by a simple heat cascade, thereby providing additional opportunities for reducing process carbon footprint in a multiple-stage process. The concept of mechanical vapor compression in fractionation has been disclosed in patents and deployed in reducing process energy requirements for many decades. Mechanical vapor compression has been widely deployed in water treatment, food processing, pharmaceuticals, and brewing. The primary application has been in evaporation processes. When applied, mechanical vapor compression has typically been relegated to recovering energy within a single process stage.

Improved methods and systems are desired commercially for reducing energy demand and process carbon intensity in a wide range of industrial refineries and biorefineries.

SUMMARY OF THE INVENTION

Some variations of the invention provide a multiple-stage, energy-integrated process comprising:
(a) providing a plurality of process stages collectively configured for continuously or semi-continuously converting a feedstock into one or more products, wherein the plurality of process stages utilizes vapor-liquid phase changes;
(b) providing a vapor-compression system, wherein the vapor-compression system includes at least a first vapor compressor and a second vapor compressor, wherein the first vapor compressor is a mechanical vapor compressor or a thermal vapor compressor, and wherein the second vapor compressor is a mechanical vapor compressor or a thermal vapor compressor;

(c) sequentially arranging the first and second vapor compressors to increase the pressure and condensing temperature of first vapors within a first process stage and second vapors within a second process stage that is downstream of the first process stage, thereby providing compressed first vapors and compressed second vapors;

(d) directing at least a portion of the compressed first vapors to (i) the second stage, (ii) a process stage, if any, that is downstream of the second stage, (iii) a process stage, if any, that is upstream of the first stage, or (iv) combinations thereof;

(e) optionally, directing at least a portion of the compressed second vapors to (i) the first process stage, (ii) a process stage, if any, that is upstream of the first stage, (iii) a process stage, if any, that is downstream of the second stage, or (iv) combinations thereof;

(f) optionally, directing at least a portion of the compressed first vapors back to the first stage; and (g) optionally, directing at least a portion of the compressed second vapors back to the second stage.

The feedstock may include fossil hydrocarbons, renewable bio-based natural substrates, or a combination thereof.

In some embodiments, at least one of steps (e), (f), and (g) are conducted, or at least two of steps (e), (f), and (g) are conducted, or steps (e), (f), and (g) are all conducted.

The plurality of process stages may be at least three process stages, for example.

In some embodiments, at least one of the first process stage or the second process stage is selected from distillation, evaporation, stripping, molecular-sieve treatment, chemical reaction, and combinations thereof. When a process involves chemical reaction, the chemical reaction may be selected from the group consisting of oxidation, reduction, hydrolysis, condensation, transesterification, oligomerization, polymerization, crystallization, isomerization, reforming, cracking, dehydrosulfurization, hydrotreating, alkylation, hydrogenation, dehydrogenation, dehydration (olefin formation), cyclicization, coking, catalyst regeneration, and combinations thereof, for example.

In some embodiments, a third vapor compressor is configured to compress a heat-exchange medium that is out-of-contact with third vapors within a third process stage, and wherein the third vapor compressor is a mechanical vapor compressor or a thermal vapor compressor.

The multiple-stage, energy-integrated process may be conducted in a biorefinery, a petroleum refinery, a chemical plant, a petrochemical plant, a biochemical plant, a natural gas refinery, a shale oil refinery, a coal-derived product refinery, or a syngas-derived product plant, for example.

Other variations of the invention provide a multiple-stage, energy-integrated system comprising:

(a) a plurality of process sub-systems collectively configured for continuously or semi-continuously converting a feedstock into one or more products, wherein the plurality of process sub-systems is configured to utilize vapor-liquid phase changes; and (b) a vapor-compression sub-system, wherein the vapor-compression sub-system includes at least a first vapor compressor and a second vapor compressor, wherein the first vapor compressor is a mechanical vapor compressor or a thermal vapor compressor, and wherein the second vapor compressor is a mechanical vapor compressor or a thermal vapor compressor, wherein the first and second vapor compressors are sequentially arranged and configured to increase pressure and condensing temperature of first vapors within a first process sub-system and second vapors within a second process sub-system that is physically separated from, but in flow communication with, the first process sub-system;

wherein the first vapor compressor is in flow communication with the second process sub-system, or a third process sub-system, via a first compressed-vapor line, wherein the first compressed-vapor line is configured with a first control valve;

optionally, wherein the second vapor compressor is in flow communication with the first process sub-system, the third process sub-system, or a fourth process sub-system, via a second compressed-vapor line, wherein the second compressed-vapor line is configured with a second control valve;

optionally, wherein the first vapor compressor is in flow communication with the first process sub-system; and optionally, wherein the second vapor compressor is in flow communication with the second process sub-system.

In some embodiments, the first vapor compressor is in flow communication with the second process sub-system. In these or other embodiments, the first vapor compressor is in flow communication with the third process sub-system.

In some embodiments, the second vapor compressor is in flow communication with the first process sub-system. In these or other embodiments, the second vapor compressor is in flow communication with the third process sub-system and/or with the fourth process sub-system.

Alternatively, or additionally, the first vapor compressor may be in flow communication with the first process sub-system. The second vapor compressor may be in flow communication with the second process sub-system.

The plurality of process sub-systems may be at least three process sub-systems, for example.

At least one of the first process sub-system or the second process sub-system may be selected from a distillation unit, an evaporation unit, a stripping unit, a molecular-sieve unit, a chemical reactor, and combinations thereof, for example.

In some embodiments, a third vapor compressor is configured to compress a heat-exchange medium that is out-of-contact with third vapors within a third process sub-system, wherein the third vapor compressor is a mechanical vapor compressor or a thermal vapor compressor.

The multiple-stage, energy-integrated system may be a portion or the entirety of a biorefinery, a petroleum refinery, a chemical plant, a petrochemical plant, a biochemical plant, a natural gas refinery, a shale oil refinery, a coal-derived product refinery, or a syngas-derived product plant, for example.

Figure 1:
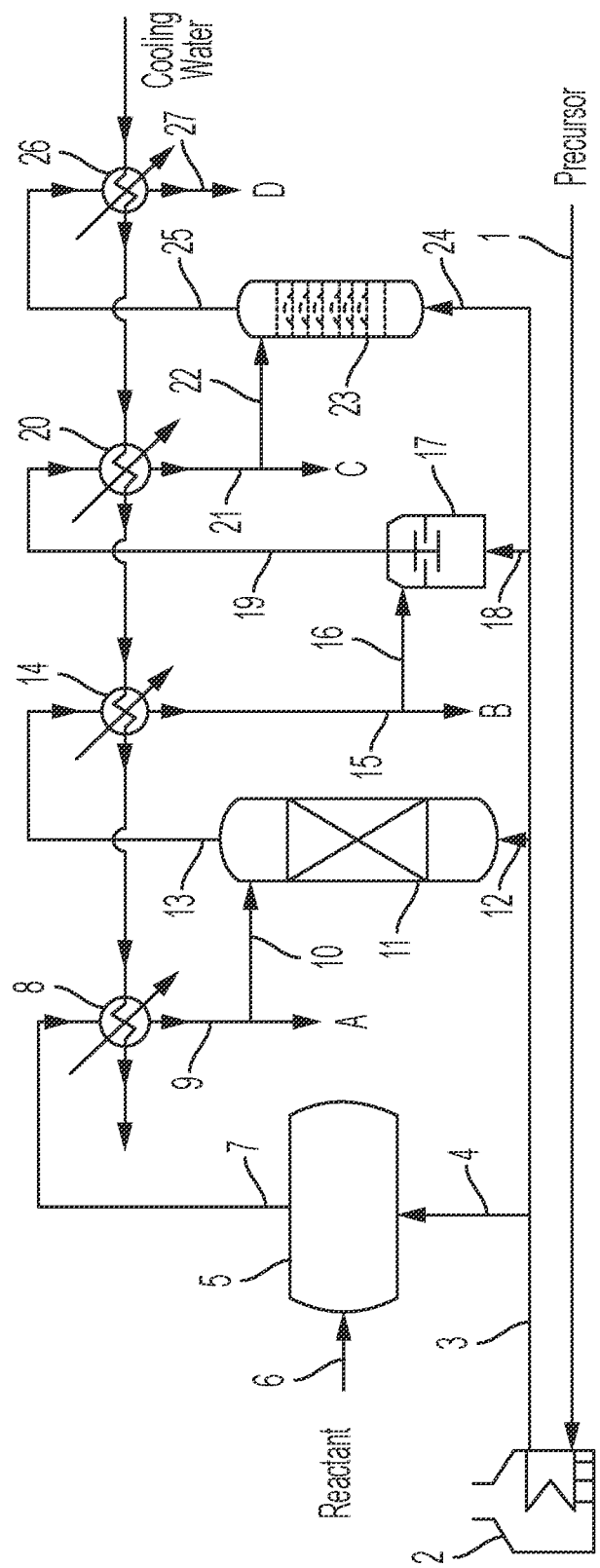
FIG. 1 shows a process (conventional art) in which a precursor passes to a multistage process. The process stages are arranged in a configuration wherein the products of each stage are flowing from a higher temperature to a lower temperature. There is no heat reuse between stages.

These and other embodiments, features, and advantages of the present invention will become more apparent to those skilled in the art when taken with reference to the following detailed description.

DETAILED DESCRIPTION OF EMBODIMENTS OF THE INVENTION

Certain embodiments of the present invention will now be described in more detail, in a manner that will allow a person of ordinary skill in this art to make and use the present invention. All references herein to the "invention" shall be construed to refer to non-limiting embodiments disclosed in this patent application.

Unless otherwise indicated, all numbers expressing conditions, concentrations, yields, and so forth used in the specification and claims are to be understood as being modified in all instances by the term "about." Accordingly, unless indicated to the contrary, the numerical parameters set forth in the following specification and attached claims are approximations that may vary depending at least upon the specific analytical technique. Any numerical value inherently contains certain errors necessarily resulting from the standard deviation found in its respective testing measurements.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs. If a definition set forth in this section is contrary to or otherwise inconsistent with a definition set forth in patents, published patent applications, and other publications that are incorporated by reference, the definition set forth in this specification prevails over the definition that is incorporated herein by reference.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

In applying mechanical vapor compression and/or thermal vapor compression in industrial processes, conventional practice has favored isolated compression loops that optimize individual process stages. The present inventors have recognized that the conventional approach sacrifices efficiencies. The disclosed approach of integrating compression loops across multiple process stages is more efficient.

The present invention utilizes mechanical vapor compression and/or thermal vapor compression integrating compression loops across multiple process stages. A sequential network of compressors is utilized to increase the pressure and condensing temperature of the vapors within each process stage, as intra-vapor flow, and branching between process stages, as inter-vapor flow. Because the vapors available are shared among and between compressor stages, the number of compressors can be reduced, improving economics. Balancing vapor mass flow through incremental compressor stages which traverse multiple process stages by splitting vapors between compressor stages enables the overall vapor-compression system to be tailored to individual process energy requirements and to accommodate dynamic fluctuations in process conditions.

The present invention is predicated, at least in part, on the incorporation of multiple compressors in an integrated network design comprising series and/or parallel legs, with vapor flow control valves balancing the compressed vapors within (intra) and between (inter) process stages. The integrated design optimizes process energy usage by increasing the pressure and temperature of condensable vapors to a level that permits re-introduction of the heat of condensation into an integrated system of multiple process stages, with all or a portion of the vapors passing back to the vapor sourcing process stage and/or the next process stage, while meeting process requirements for mass flow and pressure/temperature dynamic operating ranges.

Conventional plant designs typically cascade heat from process stages operating at higher temperatures with their associated pressures, passing all or a portion of the process heat to process stages operating at lower temperatures and their associated pressures, in order to increase efficiency through a reduction in total plant energy requirements. This approach usually depends upon thermal energy introduced into the process from the combustion of fuels. Cascading heat between process stages increases the temperature range over which useful energy can be supplied to those stages, but ultimately results in the loss of the heat carrier's heat of condensation when the lower-temperature process-stage vapors are then cooled and returned to liquid form. Passive cascading of heat between process stages involves adjusting process conditions through restricting mass flow and/or adding process heat, concluding in condensation of the lowest grade flow (lowest temperature and pressure) and loss of the heat of condensation of that flow.

By contrast, the present inventors have discovered that integrating multiple process stages via integrated compression within and between stages provides a means of greatly increasing process energy efficiency with existing process stages (e.g., distillation towers and reaction vessels) and optimization of process conditions, as well as a means of adding flexibility in adjusting to process dynamics. Such an integrated system with intra/inter compressed vapor control permits tailoring process conditions to reduce fouling, alter process water balance, and meet other operational goals that are unattainable through simple process designs utilizing only the method of cascading heat between process stages. Capturing the heat carrier in vapor form prior to condensation and increasing its pressure and temperature by compression allows condensation to occur in a heat exchanger at a higher condensing temperature that returns the heat of condensation under conditions that allow reuse in the overall process. This configuration recovers process heat that would otherwise be lost to the cooling towers and/or the atmosphere.

Conventional applications for intra-process-stage vapor compression, such as within single-process-stage evaporation, lack the more complex balancing and system design challenges of multi-process stage integrated systems. The conventional recompression approach facilitates high efficiencies in single process stages, but at the cost of limiting the total potential cumulative benefits of the "whole plant" approach, as disclosed herein, that leverages process synergies to expand available design options throughout the intra/inter process stages.

The more-complex approach disclosed herein permits process optimization to meet environmental, economic, or efficiency targets, or a blend of such goals. The complexity of the present invention, however, is not beyond the skill of a chemical engineer, as will be appreciated by skilled artisans reading this disclosure. Advanced control systems, including the use of algorithms for network optimization, can support effective control of the invention's more complex array of compressors within an integrated system design. As an example, linear programming or stochastic Monte Carlo simulations can use system design conditions and/or probability distributions describing system process conditions over time to optimize process performance through adjustments to vapor compression subsystems. Increasing an individual compressor's speed and power, turning off or on parallel compressors, and modulating the flow valves to control system mass flow provide a means of system performance adjustment allowing achievement of a variety of potential aims, including (but not limited to) reducing carbon intensity, increasing process efficiency, or reducing operating cost.

The meaningful and sizable reduction in thermal energy usage of industrial processes according to embodiments of the invention will also substantially reduce the carbon intensity ascribed to the plant's process. The energy demand in the process stages of a standard refinery without mechanical vapor compression represents a major portion of the total process energy, with a small additional amount of electrical process energy used in pumping, stirring, and fan operation.

Mechanical vapor compression, when used in separation process stages, recycles the process heat by closed heat pump methods as described by U.S. Pat. No. 6,375,803 issued to Razzaghi et al. on Apr. 23, 2002, which is incorporated by reference herein. See also WO 2013/116789 A1 to Batty et al., published Aug. 8, 2012, which is incorporated by reference herein. In a system using best mechanical vapor compression design practices, the mechanical energy of the compression is equivalent to about 10% to 20% of the thermal energy displaced, compared to that required for the identical process stage without compression. The advantage of the compression loop is limited to the temperature difference traversed in the cycle, where a smaller temperature difference yields the greatest advantage.

The invention provides the integration of mechanical vapor compression and/or thermal vapor compression in multiple vapor-processing units for a reduction in process energy in industrial refining or other industrial processes. Several examples are provided to demonstrate possible configurations for the use of mechanical or thermal vapor compression in liquid-vapor fractionation or other vapor processing for general refinery or biorefinery processing.

The term "process energy" herein refers to the thermal energy required to raise process steam by burning fuels, the direct heating of processes by burning fuels, and the electrical energy required for mechanical power such as that used in pumping.

The term "process stage" herein refers to an individual unit operation within an overall process or system, such as a refinery. Generally speaking, a process employs a plurality of individual process stages. Unless otherwise indicated, the term "process" refers to an overall process for converting a feedstock into a final product. A process stage may be regarded as a step of an overall process. A process stage may also be regarded as a sub-system of an overall system. That is, depending on the context, a process stage may refer to a process step or to a physical sub-system; unless otherwise indicated, a process stage will refer to a process step. Process stages as physical sub-systems may be vapor-processing units. Vapor-processing units may include, but are by no means limited to, distillation units, stripping units, flash units, single-effect evaporators, multiple-effect evaporators, molecular-sieve units, and chemical reactors.

When the vapor-processing unit is a chemical reactor (e.g., a catalytic reactor), such reactor may be for a chemical reaction selected from the group consisting of, for example, oxidation, reduction, hydrolysis, transesterification, condensation, oligomerization, polymerization, crystallization, isomerization, reforming, cracking, dehydrosulfurization, hydrotreating, alkylation, hydrogenation, dehydrogenation, dehydration (olefin formation), cyclization, coking, catalyst regeneration, and combinations thereof.

The term "multistage process" (equivalently, "multiple-stage process") herein refers to methods and systems in which precursor raw materials are transformed into a mixture of components that require separation, purification, and/or refining to isolate finished products. The finished products, with sufficient purification, have value as precursors to further reaction processes or commercial value in their natural state. A multistage process contains at least 2 process stages, such as 2, 3, 4, 5, 6, 7, 8, 9, 10, or more process stages. For example, refineries typically employ multiple fractionations for the refinement of multiple product streams. Exemplary multistage process methods and systems include, but are by no means limited to, biorefineries, petroleum refineries, petrochemical plants, natural gas refineries, shale oil refineries, coal-derived product refineries, and syngas-derived product plants. Unless otherwise indicated, a refinery is a general term encompassing biorefineries as well.

The use of vapor compression provides a means of increasing the temperature and pressure of vapors so that their heat of condensation is usable in upstream and downstream processing. Standard practice uses cooling water to condense vapors at low temperatures when forming final products or inter-process sub-products, losing the heat of condensation to cooling water, thereby preventing reintroduction and reuse of that heat. Vapor compression allows for the reuse of the heat of condensation when increased pressure raises the condensing temperature to a point above the temperature required for use in the process. Vapor compression is well-established in single-process applications such as water desalination and evaporation.

The concept of mechanical vapor compression in distillation has been deployed in reducing process requirements in refining for many decades. It has also been widely deployed in water desalination and process evaporation. Mechanical vapor compression, when used in distillation, recycles the heat of distillation by a closed heat pump, as disclosed, for example, in U.S. Pat. Nos. 4,340,446, 4,422,903, 4,539,076, 4,645,569, 4,692,218, 4,746,610, 5,294,304, 7,257,945, 8,101,217, 8,101,808, 8,114,255, 8,128,787, 8,283,505, 8,304,588, 8,535,413, and 8,614,077, which are hereby incorporated by reference herein. Thermal vapor compression, when used in distillation, evaporation, dehydration, and drying, recycles latent heat by a closed heat pump, as disclosed for example in U.S. Pat. Nos. 5,772,850, 4,536,258, and 4,585,523, which are hereby incorporated by reference herein.

In this disclosure, mechanical vapor recompression (MVR) and/or thermal vapor recompression (TVR) are preferably used to produce vapor that meets conditions to best integrate and optimize energy recovery between process stages, and to reduce overall process thermal energy usage in a refinery. The heat of condensation of the compressed vapors provides energy that may be used elsewhere within an integrated refinery. Heat exchangers utilizing multiple effects, thermal vapor recompression, and/or mechanical vapor recompression are used to balance process conditions by increasing or decreasing vapor energy to serve process design requirements.

All instances of "vapor compression," "vapor recompression," MVR, TVR, and the like mean mechanical vapor recompression, thermal vapor recompression, or a combination thereof. Thermal vapor recompression may also be referred to as thermocompression or steam compression. Also see commonly owned U.S. patent application Ser. No. 15/711,699, filed on Sep. 21, 2017 (and published as US 2018/0028934 A1 on Feb. 1, 2018), which is hereby incorporated by reference herein for its descriptions of mechanical vapor compression, thermal vapor compression, and other features that may be applied to some embodiments of the present invention.

Some variations of the invention provide a multiple-stage, energy-integrated process comprising:
(a) providing a plurality of process stages collectively configured for continuously or semi-continuously converting a feedstock into one or more products, wherein the plurality of process stages utilizes vapor-liquid phase changes;
(b) providing a vapor-compression system, wherein the vapor-compression system includes at least a first vapor compressor and a second vapor compressor, wherein the first vapor compressor is a mechanical vapor compressor or a thermal vapor compressor, and wherein the second vapor compressor is a mechanical vapor compressor or a thermal vapor compressor;

(c) sequentially arranging the first and second vapor compressors to increase pressure and condensing temperature of first vapors within a first process stage and second vapors within a second process stage that is downstream of the first process stage, thereby providing compressed first vapors and compressed second vapors;

(d) directing at least a portion of the compressed first vapors to (i) the second stage, (ii) a process stage, if any, that is downstream of the second stage, (iii) a process stage, if any, that is upstream of the first stage, or (iv) combinations thereof;

(e) optionally, directing at least a portion of the compressed second vapors to (i) the first process stage, (ii) a process stage, if any, that is upstream of the first stage, (iii) a process stage, if any, that is downstream of the second stage, or (iv) combinations thereof;

(f) optionally, directing at least a portion of the compressed first vapors back to the first stage; and (g) optionally, directing at least a portion of the compressed second vapors back to the second stage.

The feedstock may include fossil hydrocarbons, renewable bio-based natural substrates (which may be mechanically or chemically pretreated), or a combination thereof.

In some embodiments, at least one of steps (e), (f), and (g) are conducted, or at least two of steps (e), (f), and (g) are conducted, or steps (e), (f), and (g) are all conducted.

The plurality of process stages may be at least three process stages, for example.

In some embodiments, at least one of the first process stage or the second process stage is selected from distillation, evaporation, stripping, molecular-sieve treatment, chemical reaction, and combinations thereof. When a process involves chemical reaction, the chemical reaction may be selected from the group consisting of oxidation, reduction, hydrolysis, condensation, transesterification, oligomerization, polymerization, crystallization, isomerization, reforming, cracking, dehydrosulfurization, hydrotreating, alkylation, hydrogenation, dehydrogenation, dehydration (olefin formation), cyclicization, coking, catalyst regeneration, and combinations thereof, for example.

The compressed first vapors contain a process vapor (e.g., a hydrocarbon or alcohol) and may further contain steam. The compressed second vapors also contain a process vapor and may further contain steam. In preferred embodiments, the compressed first vapors do not consist solely of steam, and the compressed second vapors do not consist solely of steam.

In some embodiments, a third vapor compressor is configured to compress a heat-exchange medium that is out-of-contact with third vapors (into compressed third vapors) within a third process stage, and wherein the third vapor compressor is a mechanical vapor compressor or a thermal vapor compressor. The compressed third vapors contain a process vapor and may further contain steam. In preferred embodiments, the compressed third vapors do not consist solely of steam.

The multiple-stage, energy-integrated process may be conducted in a biorefinery, a petroleum refinery, a chemical plant, a petrochemical plant, a biochemical plant, a natural gas refinery, a shale oil refinery, a coal-derived product refinery, or a syngas-derived product plant, for example.

Other variations of the invention provide a multiple-stage, energy-integrated system comprising:

(a) a plurality of process sub-systems collectively configured for continuously or semi-continuously converting a feedstock into one or more products, wherein the plurality of process sub-systems is configured to utilize vapor-liquid phase changes; and (b) a vapor-compression sub-system, wherein the vapor-compression sub-system includes at least a first vapor compressor and a second vapor compressor, wherein the first vapor compressor is a mechanical vapor compressor or a thermal vapor compressor, and wherein the second vapor compressor is a mechanical vapor compressor or a thermal vapor compressor, wherein the first and second vapor compressors are sequentially arranged and configured to increase pressure and condensing temperature of first vapors within a first process sub-system and second vapors within a second process sub-system that is physically separated from, but in flow communication with, the first process sub-system;

wherein the first vapor compressor is in flow communication with the second process sub-system, or a third process sub-system, via a first compressed-vapor line, wherein the first compressed-vapor line is configured with a first control valve;

optionally, wherein the second vapor compressor is in flow communication with the first process sub-system, the third process sub-system, or a fourth process sub-system, via a second compressed-vapor line, wherein the second compressed-vapor line is configured with a second control valve;

optionally, wherein the first vapor compressor is in flow communication with the first process sub-system; and optionally, wherein the second vapor compressor is in flow communication with the second process sub-system.

In some embodiments, the first vapor compressor is in flow communication with the second process sub-system. In these or other embodiments, the first vapor compressor is in flow communication with the third process sub-system.

In some embodiments, the second vapor compressor is in flow communication with the first process sub-system. In these or other embodiments, the second vapor compressor is in flow communication with the third process sub-system and/or with the fourth process sub-system.

Alternatively, or additionally, the first vapor compressor may be in flow communication with the first process sub-system. The second vapor compressor may be in flow communication with the second process sub-system.

The plurality of process sub-systems may be at least three process sub-systems, for example.

At least one of the first process sub-system or the second process sub-system may be selected from a distillation unit, an evaporation unit, a stripping unit, a molecular-sieve unit, a chemical reactor, and combinations thereof, for example.

In some embodiments, a third vapor compressor is configured to compress a heat-exchange medium that is out-of-contact with third vapors within a third process sub-system, wherein the third vapor compressor is a mechanical vapor compressor or a thermal vapor compressor.

The multiple-stage, energy-integrated system may be a portion or the entirety of a biorefinery, a petroleum refinery, a chemical plant, a petrochemical plant, a biochemical plant, a natural gas refinery, a shale oil refinery, a coal-derived product refinery, or a syngas-derived product plant, for example.

A more detailed description of certain embodiments of the present invention such that a person of ordinary skill in this art can make and use the present invention follows. Note that all references herein to the "invention" shall be construed as references to embodiments of the invention.

Each schematic drawing in FIGS. 1 to 10 shows a generalized process flow for a refinery, containing multiple process stages, producing products A, B, C, and D (without limitation on the number of specific products produced). These drawings each have a feedstock described as a Precursor, which may be petroleum, a petrochemical, a biochemical, or a renewables stream (e.g., derived from biomass), for example. The generalized refinery process stages are configured such that a mixture of compounds is extracted by ordinary refining methods. The compounds may pass to a reactor vessel in which chemical reactions or processing lead to a fraction of products which are separated through distillation, evaporation, or countercurrent process stages, for example.

FIG. 1 shows a process in which a precursor passes to a multistage process. The process stages are arranged in a configuration wherein the products of each stage are flowing from a higher temperature to a lower temperature. FIG. 1 describes a standard process with no heat reuse between stages. Each process stage has a condenser through which the process heat from each stage is discarded.

Figure 2:
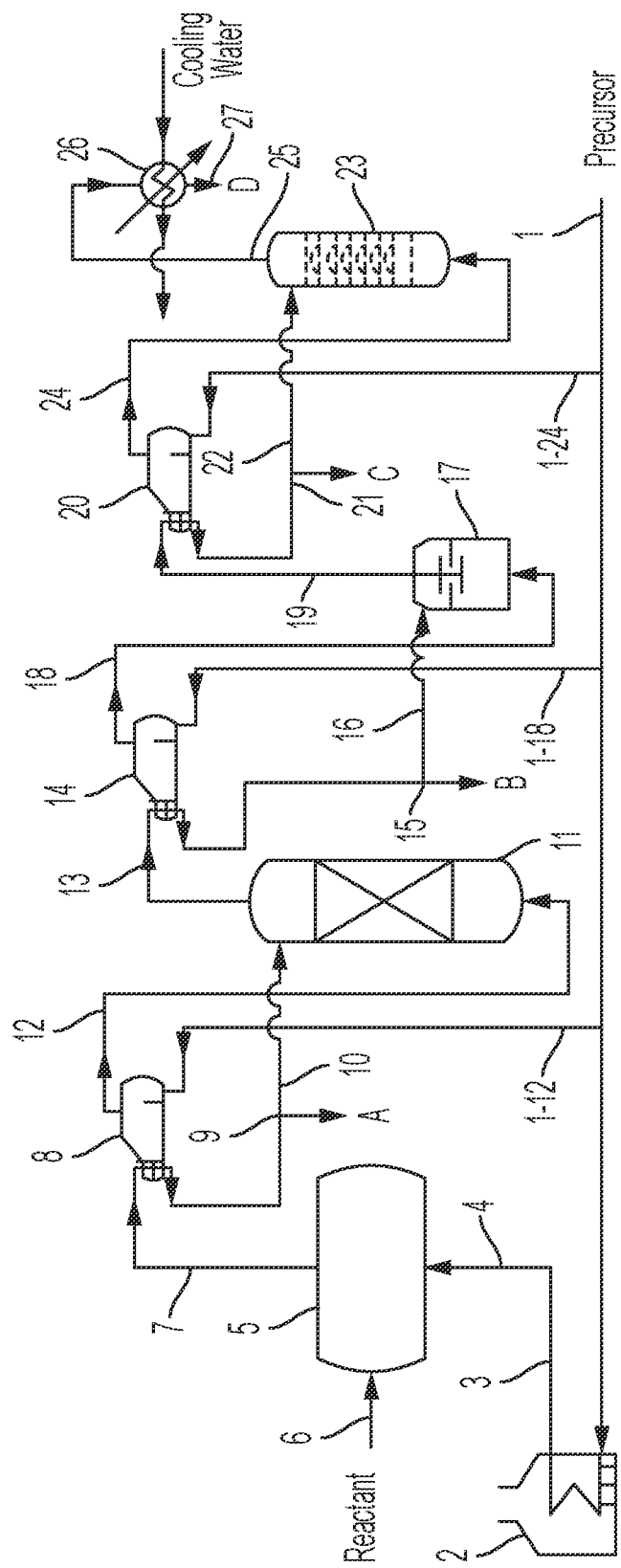
FIG. 2 shows a multistage process (conventional art) in which each process stage has been organized in order that an upstream process stage having a higher temperature than a downstream process stage can pass the heat from the upstream process stage to the downstream process stage via an out-of-contact heat exchanger. The final stage in the cascade chain has a condenser in which the process heat from the final process stage is discarded.

FIG. 2 shows a multistage process in which each process stage has been organized in order that an upstream process stage having a higher temperature than a downstream process stage can pass the heat from the upstream process stage to the downstream process stage via an out-of-contact heat exchanger. The final stage in the cascade chain has a condenser in which the process heat from the final process stage is discarded.

FIG. 1 depicts multiple process stages with the benefit of neither heat cascading nor mechanical vapor compression. FIG. 2 has the same process configuration as FIG. 1, with the understanding that each subsequent process stage is at a higher temperature than the next process stage and the process heat is partially or fully cascaded to the next process. FIGS. 1 and 2 each encompass a multistage process for reaction and/or separation of a mixture into subcomponents. FIG. 1 demonstrates multiple process stages for the formation and separation of a mixture into subcomponents where each process stage is driven by vapors raised thermally by a fired boiler or steam-driven boiler and the vapors condensed in a condenser. FIG. 2 shows the same process stages, which are arranged in order from the highest-temperature process stage to a lower-temperature process stage with the vapors from each process stage passing to the next process stage and the condensing vapors' heat cascaded to the next process stage with the final process stage passing the vapor's condensing heat to a single condenser. FIGS. 1 and 2 represent conventional art.

Figure 3:
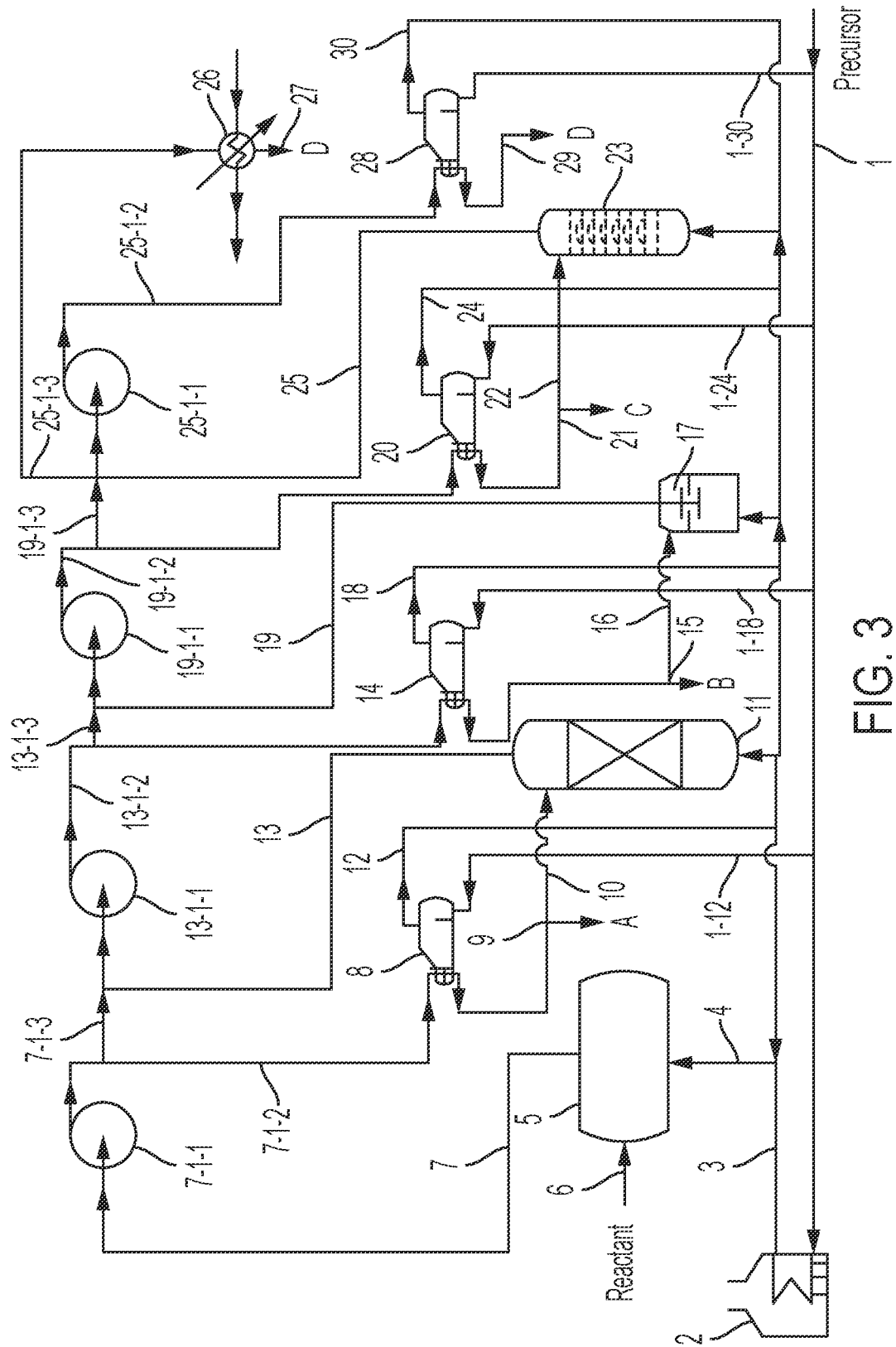
FIG. 3 is a schematic drawing showing an exemplary multistage process wherein the vapors from each stage are mechanically compressed to a pressure such that the condensing temperature is increased to a point that permits the heat of vaporization to be passed, via a heat exchanger, back to the process stage and/or to the next process stage.

FIG. 3 is a schematic drawing showing multistage processing, wherein the vapors from each stage are mechanically compressed to a pressure such that the condensing temperature is increased to a point that permits the heat of vaporization to be passed, via a heat exchanger, back to the process stage and/or to the next process stage. The multiple mechanical compressors within the multiple process stages form a series flow of vapors through the multiple-stage process. The final process stage in the multistage process may pass a portion of the vapors to a final condenser to balance the total process heat flow.

Figure 4:
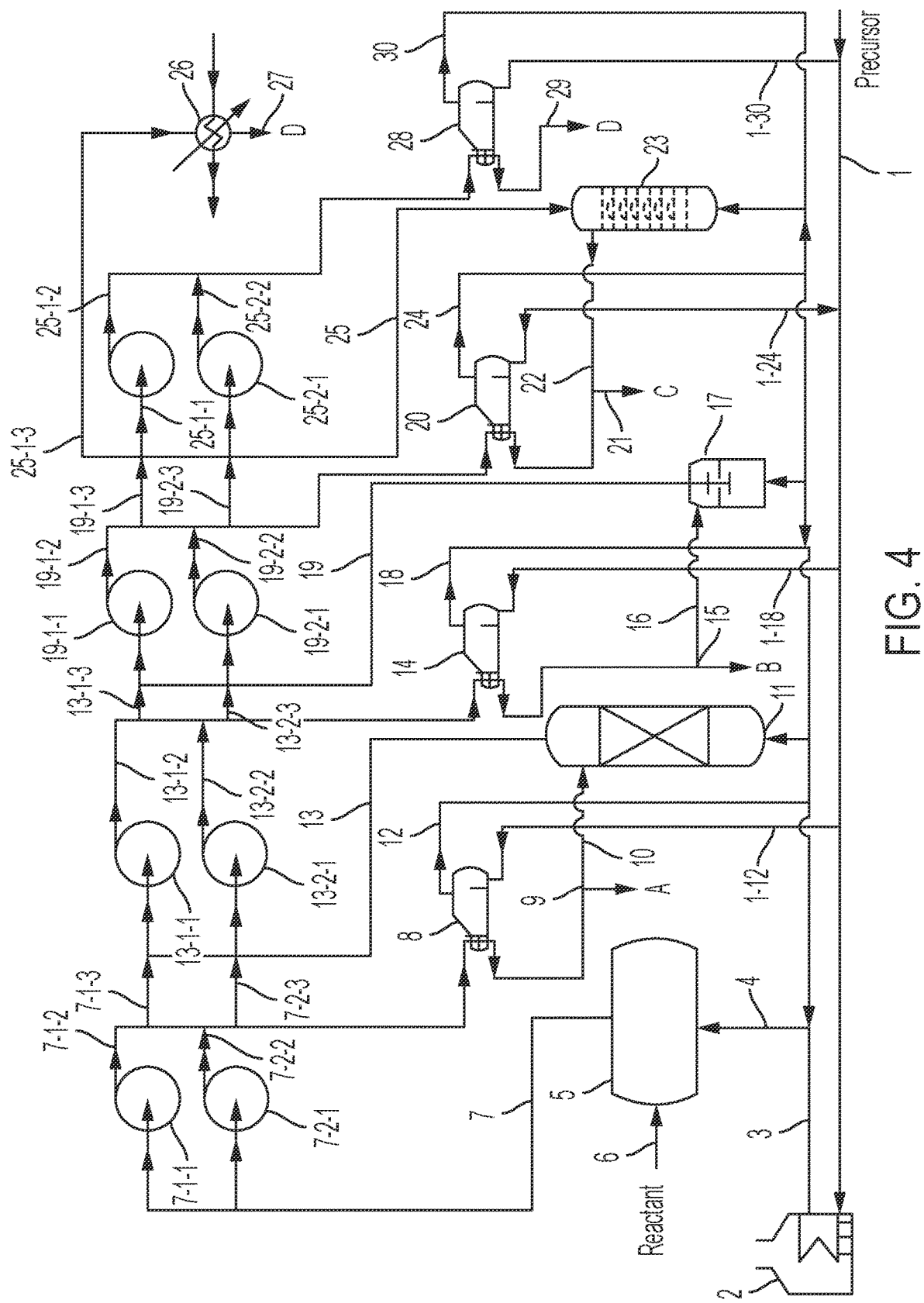
FIG. 4 is a schematic drawing showing an exemplary multistage process wherein the vapors from each stage are mechanically compressed by multiple compressors in a parallel configuration, to a level that permits the heat of vaporization to be passed, via a heat exchanger, back to the process stage and/or to the next process stage. The multiple parallel mechanical compressors allow for greater variance in the flow from each stage. The amount of vapor moved within a single stage and the amount of vapor exchanged between process stages may be selected with greater control. The multiple compressors within single process stages and across multiple process stages form a network of series and parallel flows of vapors through the multiple-stage process.

FIG. 4 is a schematic drawing showing multistage processing, wherein the vapors from each stage are mechanically compressed by multiple compressors in a parallel configuration, to a level that permits the heat of vaporization to be passed, via a heat exchanger, back to the process stage and/or to the next process stage. The multiple parallel mechanical compressors allow for greater variance in the flow from each stage. The amount of vapor moved within a single stage and the amount of vapor exchanged between process stages may be selected with greater control. The multiple compressors within single process stages and across multiple process stages form a network of series and parallel flows of vapors through the multiple-stage process. The ability to shut down parallel legs provides a broader operating range accommodating higher mass flow variability. The final process stage in the multistage process may pass a portion of the vapors to a final condenser to balance the total process heat flow.

Figure 5:
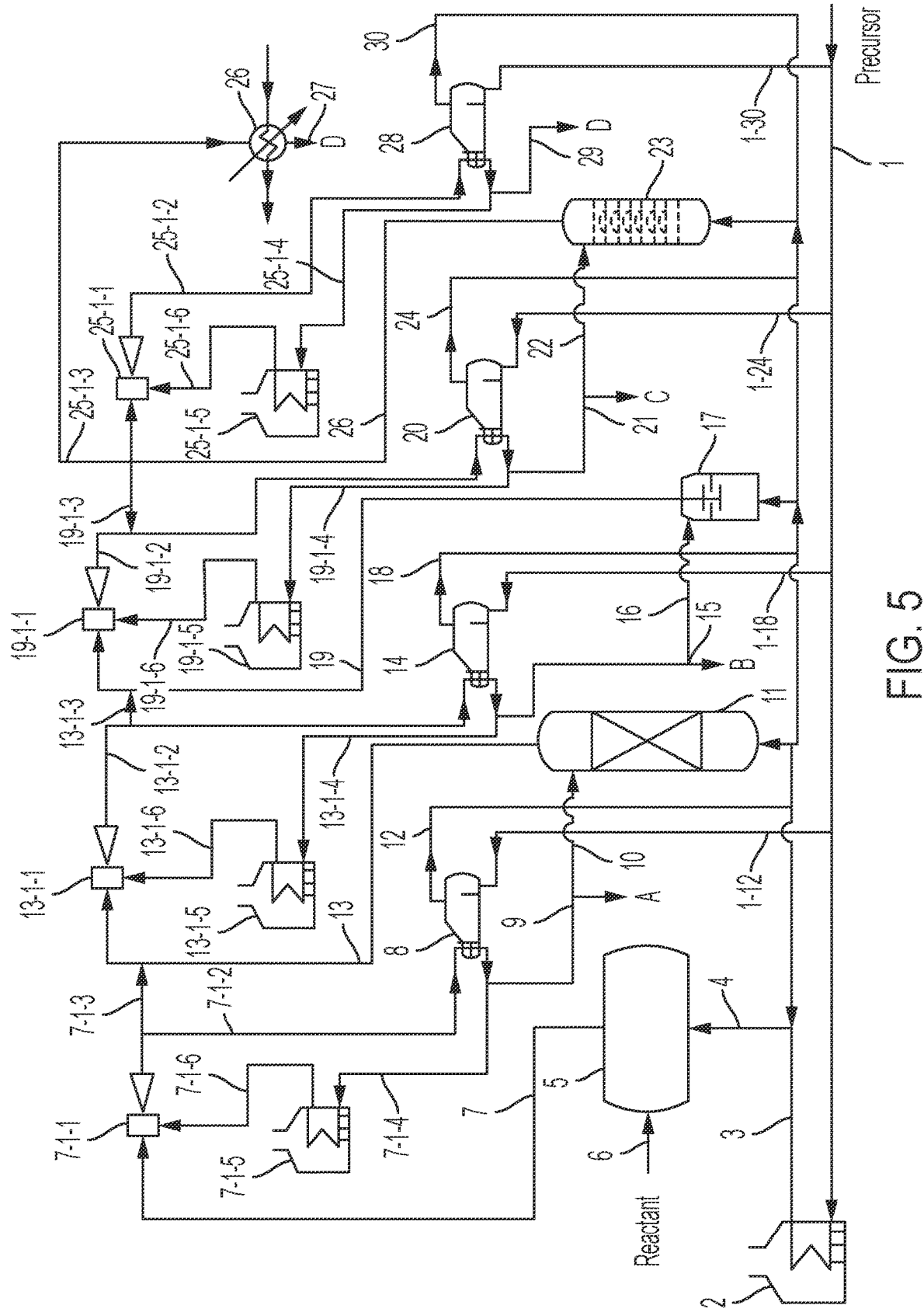
FIG. 5 is a schematic drawing showing an exemplary multistage process wherein the vapors from each stage are thermally compressed to a pressure such that the condensing temperature is increased to a point permitting the heat of vaporization to be passed, via a heat exchanger, back to the process stage and/or to the next process stage. The multiple thermal compressors within the multiple process stages form a series flow of vapors through the multiple-stage process.

FIG. 5 is a schematic drawing showing multistage processing wherein the vapors from each stage are thermally compressed to a pressure such that the condensing temperature is increased to a point permitting the heat of vaporization to be passed, via a heat exchanger, back to the process stage and/or to the next process stage. The multiple thermal compressors within the multiple process stages form a series flow of vapors through the multiple-stage process. The final process stage in the multistage process may pass a portion of the vapors to a final condenser to balance the total process heat flow.

Figure 6:
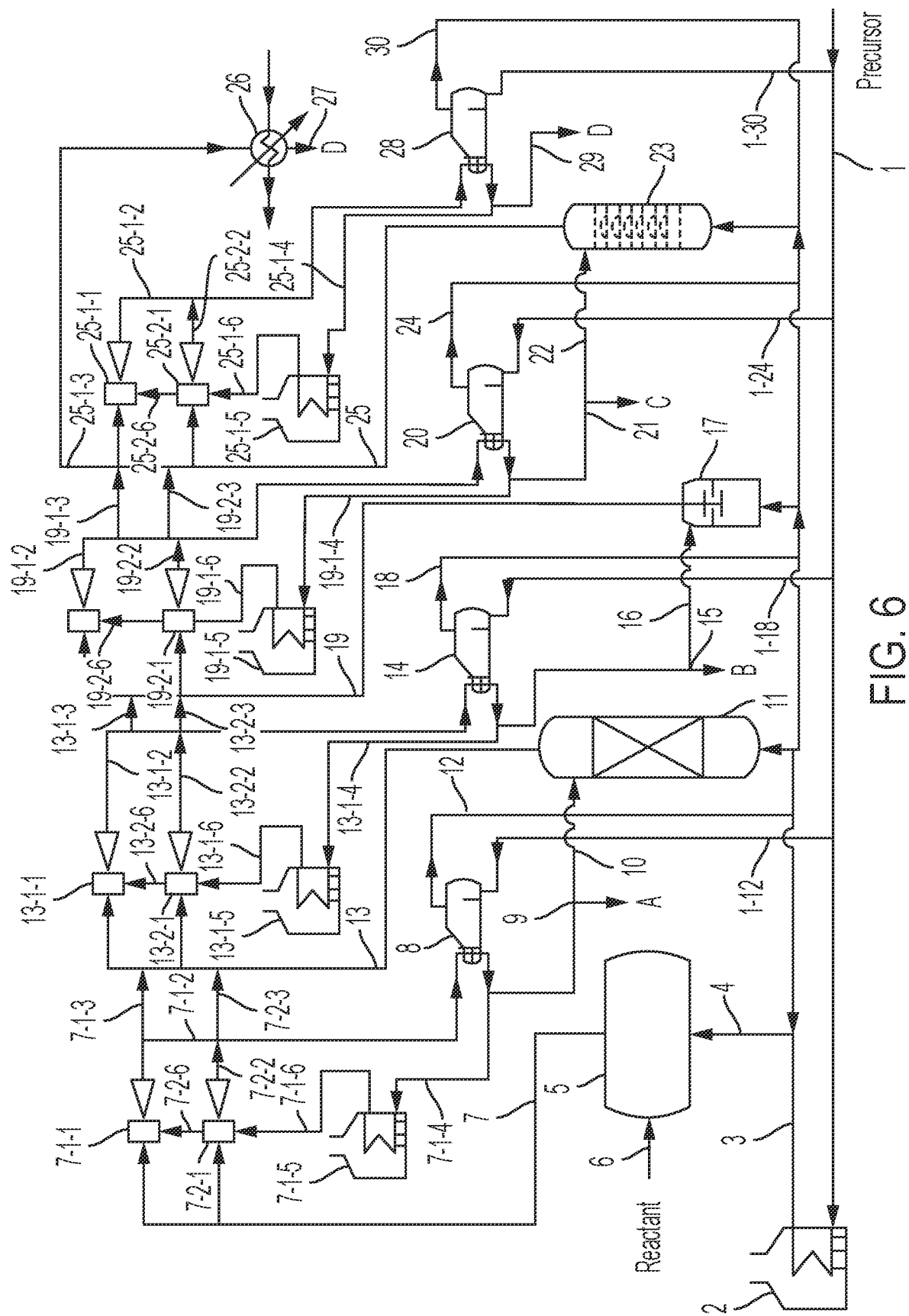
FIG. 6 is a schematic drawing showing an exemplary multistage process wherein the vapors from each stage are thermally compressed by multiple compressors in a parallel configuration to a level that permits the heat of vaporization to be passed, via a heat exchanger, back to the process stage and/or to the next process stage. The multiple parallel thermal compressors allow for greater variance in the flow from each stage allowing the amount of vapor moved within a single stage and the amount of vapor exchanged between process stages to be selected with greater control. The multiple compressors within single process stages and across the multiple process stages form a network of series and parallel flows of vapors through the multiple-stage process.

FIG. 6 is a schematic drawing showing multistage processing wherein the vapors from each stage are thermally compressed by multiple compressors in a parallel configuration to a level that permits the heat of vaporization to be passed, via a heat exchanger, back to the process stage and/or to the next process stage. The multiple parallel thermal compressors allow for greater variance in the flow from each stage allowing the amount of vapor moved within a single stage and the amount of vapor exchanged between process stages to be selected with greater control. The multiple compressors within single process stages and across the multiple process stages form a network of series and parallel flows of vapors through the multiple-stage process. The ability to shut down parallel legs provides a broader operating range, accommodating higher mass flow variability. The final process stage in the multistage process may pass a portion of the vapors to a final condenser to balance the total process heat flow.

It will be understood that while FIG. 3 and FIG. 4, and much of the present description when mechanical vapor compression is utilized, refer to mechanical vapor compression balanced within a single process stage and between multiple process stages, the path of the compressed vapors may alternatively be driven by multiple compressors configured in series and/or parallel paths to obtain the best reuse of the process heat across the entire set of process stages. Similarly, it will also be understood that while FIG. 5 and FIG. 6 and much of the present description when thermal vapor compression is utilized refer to thermal vapor compression balanced within a single process stage and between multiple process stages, the path of the compressed vapors may alternatively be driven by multiple compressors configured in series and/or parallel paths to obtain the best reuse of the process heat across the entire set of process stages. Any instance of a single compressor may be replaced by multiple compressors in some embodiments.

Each of FIGS. 3-6 encompass a multistage process for reaction and/or separation of a mixture into subcomponents. FIG. 3 and FIG. 4 depict mechanical vapor compression, while FIG. 5 and FIG. 6 depict thermal vapor compression. In each of FIGS. 3-6, a portion of the vapors passes process heat back to the process stage from whence it comes by a reboiler and a portion of the vapors passes on to other integrated process stages. FIG. 4 and FIG. 6 utilize a complex organization of compressors in which the vapors may pass via a network of series or parallel stages, giving greater options for a combination of paths for the vapor to be shared over the total process stages.

In some embodiments, the available mass flow is allocated between various process stages and each vapor may be condensed directly for heat recapture within the sourcing process stage. Alternatively, or additionally, each vapor may be condensed to generate another vapor composition through the use of a heat exchanger driving another process stage.

The multistage process as depicted in each of the schematic flow diagrams (FIGS. 1-10) generally is a refining process resulting in a mixture of products that is purified by a countercurrent fractionation and/or evaporative separation process. The multistage process is not limited in the number of distinct process stages (there will be at least two process stages).

In some embodiments, the multiple process steps or stages are described as:

1) a precursor raw material, such as petroleum, natural agricultural products or a petrochemical precursor, is fed to an initial refining process stage with separation/purification processing; the initial refining process stage may include passing a subclass of chemicals to a reaction vessel with downstream components separated or purified to generate feedstock materials;

2) a counterflow fractionation physically divides the feedstock materials into multiple sub-product streams with each stream richer in a subset of the components;

3) a separation stage vaporizes the components with lower boiling temperatures in a counterflow reaction/separation/evaporation multistage sub-system (note that "separation" may include "fractionation");

4) a separation stage subsequently condenses the components with higher boiling temperatures as liquid components moving down the reaction/separation/evaporation multistage sub-system;

5) a fractionation separation is driven by boiling the higher-temperature boiling components at the bottom of the reaction/separation/evaporation multistage sub-system as the higher-temperature boiling components move up as vapor while the counterflowing liquid moves down the reaction/separation/evaporation multistage sub-system;

6) the counterflow reaction/separation/evaporation multistage sub-system dynamically forms a temperature gradient over the vertical length of the sub-system with the highest temperature at the bottom and lowest temperature at the top;

7) the heat driving the reaction/separation/evaporation multistage sub-system enters at the bottom and passes out the top as vapors containing a subset of components from the feedstock;

8) the bottom component of the reaction/separation/evaporation multistage sub-system may be boiled by burning fuel to drive the fractionation with the top product being condensed and/or the top vapors compressed to higher pressure, raising the condensing temperature to a higher temperature than the bottom boiling temperature for recycling the fractionation system heat or the top product condensation heat may be transferred by an out-of-contact reboiler to a separate medium (e.g., water vapor or ammonia vapor) where that medium is compressed to a temperature that permits recycling of the fractionation system heat to the bottom product via a reboiler of the specified stage and/or a portion of the vapors may pass to the process stage before or after the specified stage;

9) valves control the compressed vapors between passing back to the sourcing process stage and the next process stages, allowing for a balance of intra/inter stage vapor flow;

10) multiple fractionations/evaporations for separation are used in complex refinery process stages where many components are purified to finished products; and 11) multiple fractionations/evaporations may be employed in which the product mixtures are refined in multiple stages driven by burning fuel and/or may be driven by compressing the top product vapors from the fractionation/evaporation stage.

The general multistage process refers in total to one or more reaction/separation/evaporation process stages in which each process stage requires energy in the form of thermal/fuel or mechanical/electrical, where the thermal and mechanical energy supply the heat to drive the separation of a mixture into a refined set of products or a series of stages that lead to a final high-quality product. The portion of the energy that is provided from the burning of fuel versus the portion of the heat supplied by mechanical vapor compression and/or thermal vapor compression provided by electrically powered compressors and/or thermally driven compressors may be adjusted and/or balanced to meet the energy management requirements of each stage of the total process.

Figure 7:
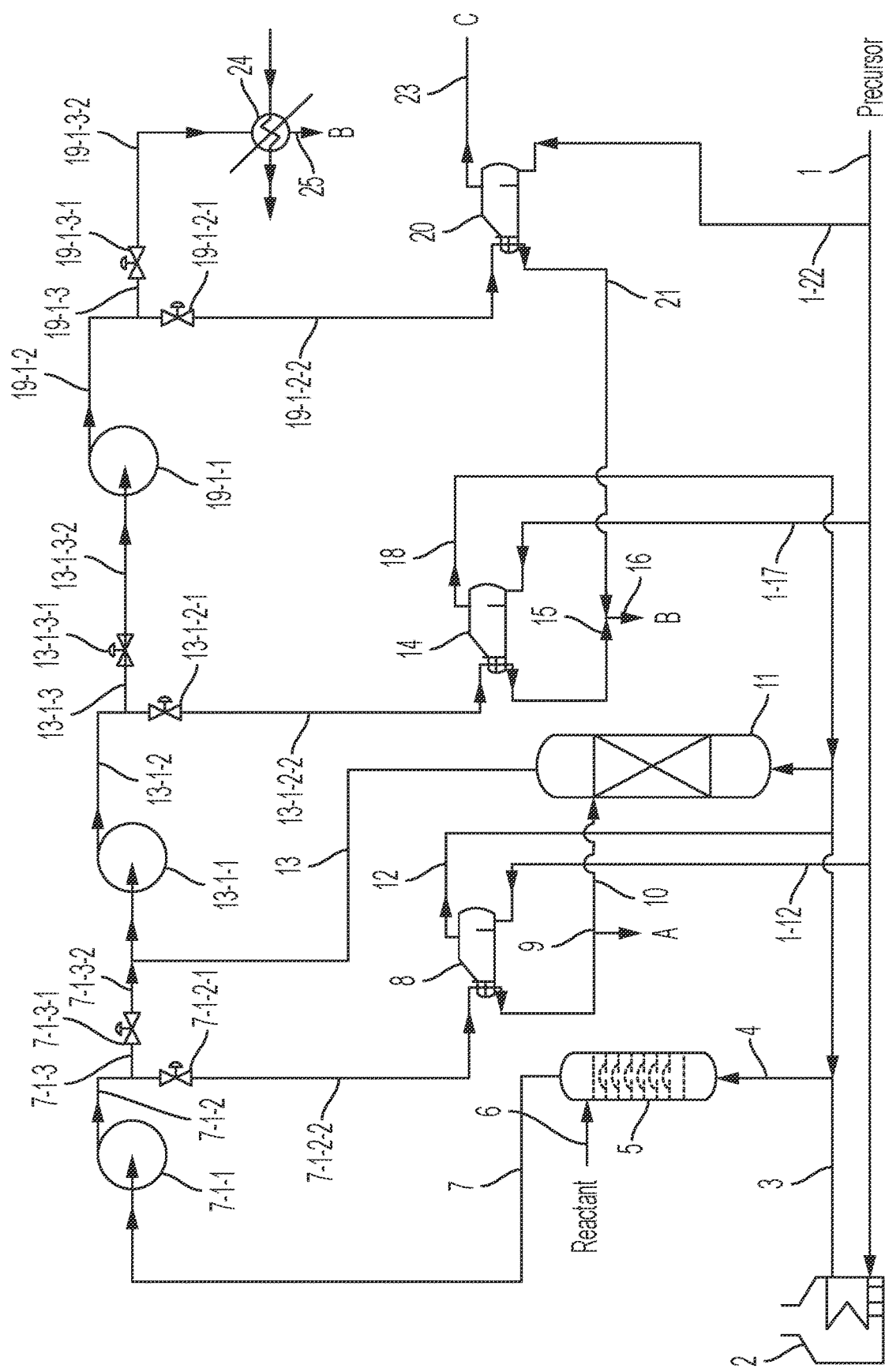
FIG. 7 is a schematic drawing showing an exemplary multistage process wherein the vapors from each stage are mechanically compressed to a pressure such that the condensing temperature is increased to a point that permits the heat of vaporization to be passed, via a heat exchanger, back to the sourcing process stage and/or to the next process stage. The multiple mechanical compressors within the multiple process stages form a series flow of vapors, controlled by valves, passing through the multistage process.
Figure 8:
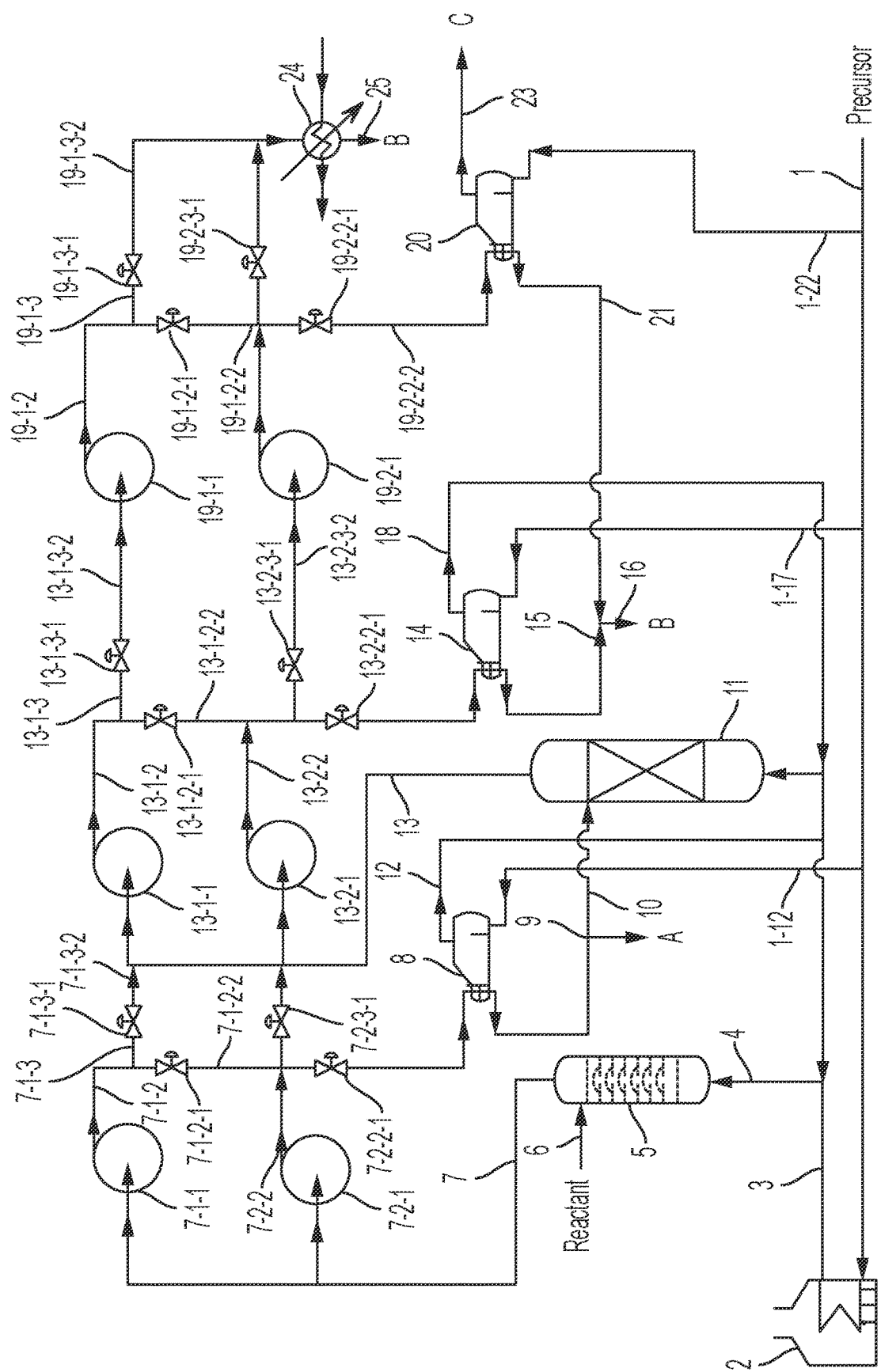
FIG. 8 is a schematic drawing showing an exemplary multistage process wherein the vapors from each stage are mechanically compressed and controlled by valves and by multiple compressors in a parallel and serial configuration, to a pressure that permits the heat of vaporization to be passed, via a heat exchanger, back to the process stage and/or to the next process stage. The multiple parallel mechanical compressors controlled by valves allow for greater variance in the flow from each stage, where the amount of vapor moved within a single stage and the amount of vapor exchanged between process stages may be selected with greater control. The multiple compressors within single process stages and across multiple process stages form a network of series and parallel flows of vapors using control valves through the multistage process.
Figure 9:
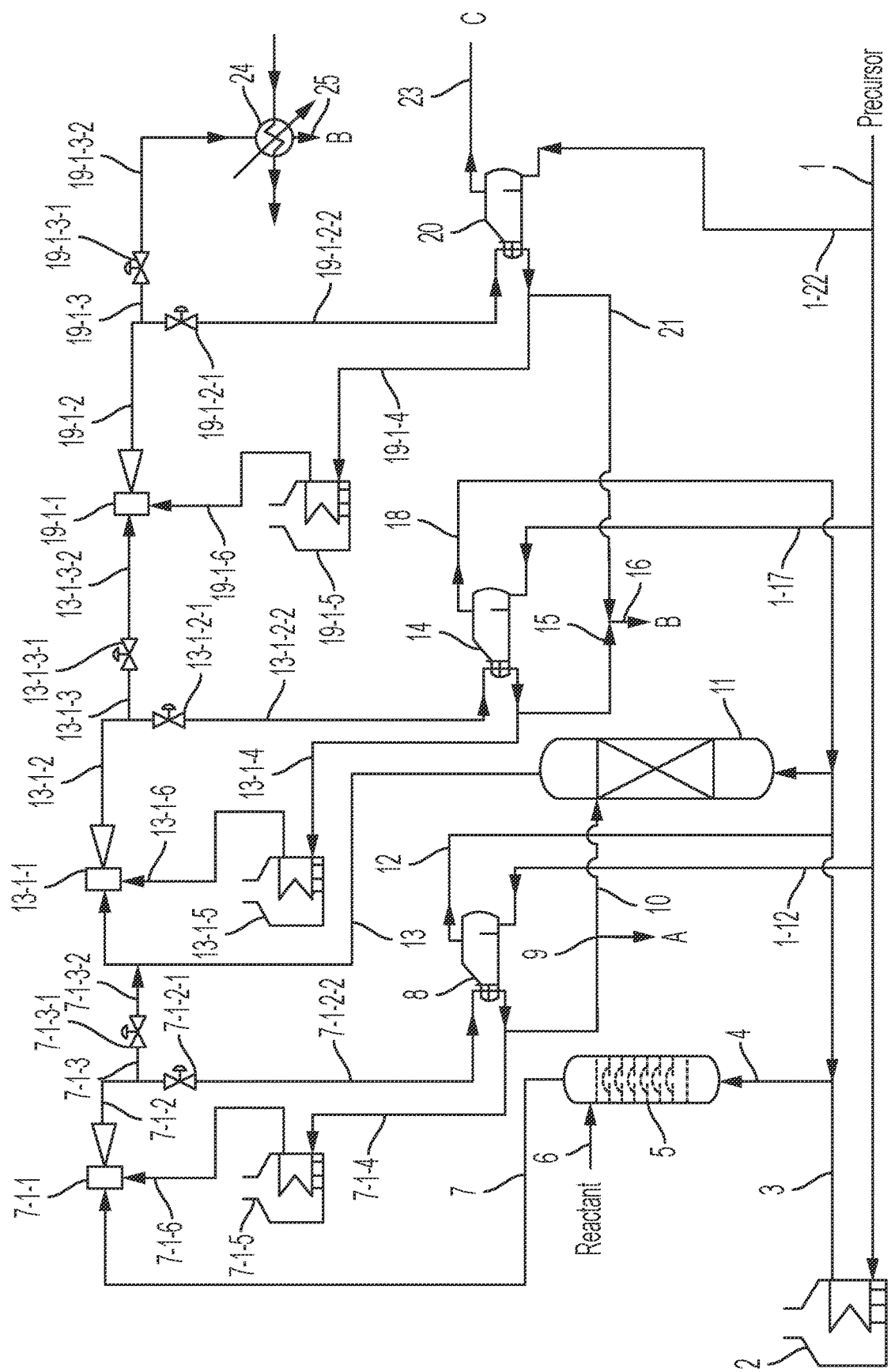
FIG. 9 is a schematic drawing showing an exemplary multistage process wherein the vapors from each stage are thermally compressed to a pressure such that the condensing temperature is increased to a point that permits the heat of vaporization to be passed, via a heat exchanger, back to the sourcing process stage and/or to the next process stage(s). The multiple thermal compressors within the multiple process stages form a series flow of vapors, controlled by valves, through the multiple stage process.
Figure 10:
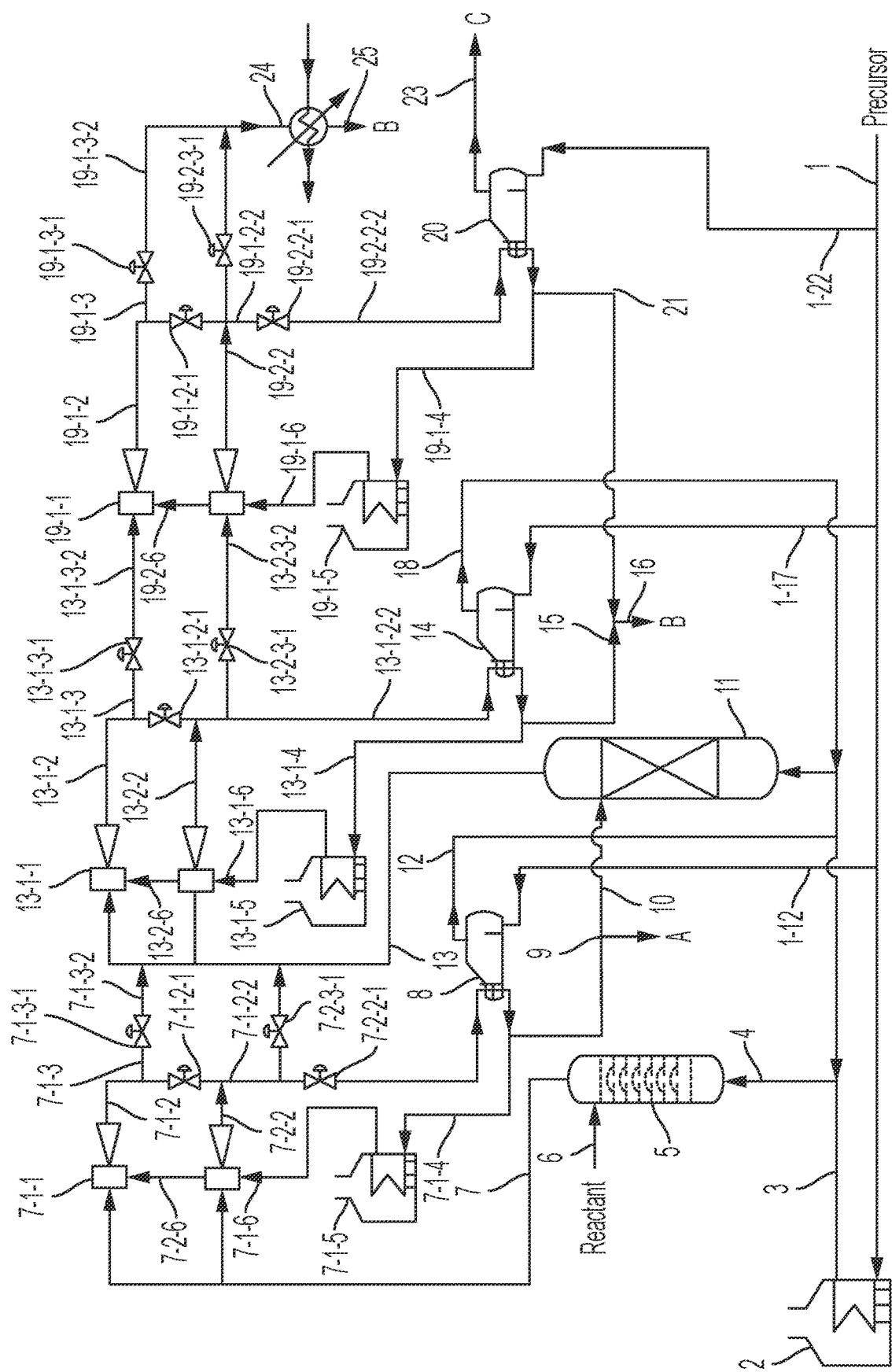
FIG. 10 is a schematic drawing showing an exemplary multistage process wherein the vapors from each stage are thermally compressed by multiple compressors in a networked parallel and serial configuration, to a level that permits the heat of vaporization to be passed, via a heat exchanger, back to the sourcing process stage and/or to the next process stage. The multiple parallel thermal compressors allow for greater variance by control valves in the flow from each stage, where the amount of vapor moved within a single stage and the amount of vapor exchanged between process stages may be selected with greater control. The multiple compressors within single process stages and across the multiple process stages form a network of series and parallel flows of vapors with mass flow varied by control valves through the multistage process.

The mechanical and/or thermal energy to compressors required in the closed loop will be less than the thermal energy recycled in the process energy distribution for the multistage reaction/separation/evaporation sub-system as described above. In standard multistage processes, the thermal process energy of the stages is the largest energy-consuming component and therefore provides the largest potential opportunity for reducing the total energy of the process. Examples of the different options available to use mechanical vapor compression in multistage processing are shown in the two schematic drawings in FIG. 3 and FIG. 4, where the thermal and mechanical-electrical distribution of energy in this part of the multistage process is described. Thermal vapor compression in the multistage processing is shown in the schematic drawings in FIG. 5 and FIG. 6, where the thermal distribution of energy in each part of the multistage process is described. FIGS. 7 and 8 show the use of mechanical vapor compression with valves for vapor flow control in multistage processing. FIGS. 9 and 10 show the use of thermal vapor compression with valves for vapor flow control in multistage processing.

The specific components of FIGS. 1-6 will now be further described. Each of these process-flow diagrams has a similar organization of stages and product flow, describing a process path starting with a precursor feedstock as a raw material comprising natural products, petroleum, or a petroleum chemical fraction, for example. The liquid effluent flows via pipe 1 with the mixture of components passing to the initial fuel burning heater vaporizer 2 where the precursor is vaporized. The vaporized mixture passes via pipe 3 to a manifold to several process stages, wherein the first manifold is pipe 4 passing to reaction vessel 5 where reagent reactants are added via pipe 6. Reaction vessel 5 may consist of, for example, an oxidation, reduction, molecular fracking, or reformation process. The resulting product mixture from the reaction process in vessel 5 passes to a condenser 8 via pipe 7 in FIG. 1. FIG. 1 has a condenser 8 where the cooling water condenses and discards the first stage heat through the liquefaction of product A passing on via pipe 9. FIG. 2 condenses the vapors within an out-of-contact heat exchanger 8 where the first-stage process heat is cascaded to the second process stage. In all drawings, the condensed product A is passed on via pipe 9 where the product A may be passed out as a finished product via pipe 9 with the balance of the product A passing via pipe 10 to vessel 11 for further processing.

Reaction vessel 5 may be configured to carry out an oxidation, reduction, hydrocracking, molecular fractionation, reformation, transesterification, isomerization, or hydrolysis process, or a combination thereof, for example.

FIG. 1 has a condenser 8 where the first-stage process heat is discarded. FIG. 2 has a heat exchanger 8 where the first-stage process heat is cascaded to the second process stage wherein vessel 5 is at sufficiently high pressure to have vapors above condensing temperature across the heat exchanger. FIG. 3 has a mechanical compressor 7-1-1 and FIG. 5 has a thermal compressor 7-1-1 that compress the vapors from vessel 5 via pipe 7 to a pressure above the condensing conditions in the heat exchanger 8, allowing vessel 5 to have a lower pressure and temperature while compressor 7-1-1 achieves a sufficiently high pressure to allow the vapors in pipe 7-1-2 to condense in heat exchanger 8. FIG. 4 and FIG. 6 have the same compression loop as described in FIG. 3 and FIG. 5 via compressor 7-1-1 while having an additional parallel compressor 7-2-1, in the case of FIG. 4 being a mechanical vapor compressor and in the case of FIG. 5 being a thermal vapor compressor.

FIG. 3 and FIG. 5 each have a compressor 7-1-1 that passes compressed vapors which are balanced and distributed between vessel 5 and heat exchanger 8 via pipe 7-1-2 and compressor 13-1-1 via pipe 7-1-3. FIG. 3 and FIG. 5 allow for varying the amount of vapor product A to be condensed in heat exchanger 8, with the balance passing on to the second stage, compressor 13-1-1, via pipe 7-1-3. FIG. 4 and FIG. 6 have a compressor 7-1-1 similar to FIG. 3 and FIG. 5, with the same conditions for recompressing vapors in heat exchanger 8, but an additional compressor 7-2-1 configured parallel to compressor 7-1-1 allows for greater variance in flow when the two compressors are operated at differing speeds. FIG. 4 and FIG. 6 show the second mechanical compressor 7-2-1 with compressed vapors passing via pipe 7-2-2 to heat exchanger 8 and the option to balance the amount of vapor passing to the next stages of the process via pipe 7-2-3.

FIG. 5 and FIG. 6 each have a portion of the liquid condensate from exchanger 8 passing back to the thermal vapor compressor driver heater 7-1-5 to produce motive vapors to drive the thermal compressor via pipe 7-1-4 with the generated vapors passing via pipe 7-1-6 to thermal vapor compressor 7-1-1, and in FIG. 6 also driving the parallel thermal vapor compressor 7-2-1 with thermal vapor compressor 7-1-1 driven from thermal vapor compressor 7-2-1 via pipe 7-2-6.

In each drawing, the vapors from vessel 5 pass via pipe 7 to be condensed in condenser 8 in FIG. 1, or in heat exchanger 8 in FIGS. 2-6. The liquid condensate passes via pipe 9, with a portion of product A passing out of the system or passing via pipe 10 to vessel 11.

FIG. 1 shows process stages operated independently of each other, since the process heat is discarded from each process stage. FIG. 2 shows process stages where the temperature of each process stage is higher than that of the next process stage, with a portion of the process heat being cascaded to the next stage, and with the final stage discarding the remaining heat. In FIGS. 3, 4, 5, and 6, each process stage is not required to have descending (stage-to-stage) condensation pressures and temperatures in the downstream stage. The reason for that is because the mechanical and/or thermal compressors may be configured to adjust the conditions between each stage sufficient to pass the process heat as desired between stages. FIGS. 3, 4, 5, and 6 show individual process stages in which process heat from the respective stage (e.g., reaction, fractionation, separation, or evaporation) is passed forward to the next process stage and/or back to the original process stage.

FIGS. 1-6 each show the second stage vessel 11 being driven by vapors from pipe 12. FIG. 1 shows the second-stage vessel 11 driven by vapors from pipe 12 from vaporizer 2 via pipe 3, while FIGS. 2-6 each show vessel 11 driven by vapors via pipe 12 where the liquid precursor passes via pipe 1-12 to heat exchanger 8 where the liquid is vaporized and passes via pipe 12 to vessel 11. Each of FIGS. 1-6 shows vapors from the second-stage vessel 11 passing via pipe 13. FIG. 1 shows the vapors from pipe 13 passing to condenser 14, whereas FIG. 2 shows the vapors from pipe 13 passing to heat exchanger 14. FIG. 3 and FIG. 4 show pipe 13 passing to mechanical compressor 13-1-1. FIG. 5 and FIG. 6 show pipe 13 passing to thermal compressor 13-1-1. FIG. 4 has an additional mechanical compressor 13-2-1. FIG. 6 has an additional thermal compressor 13-2-1 to pipe 13-1-2. FIG. 4 and FIG. 6 each have an additional pipe 13-2-2 passing compressed vapors to heat exchanger 14 via pipe 13-1-2. FIGS. 3-6 each show pipe 13-1-3 providing the option to pass a portion of the vapors to the next process stage, with FIG. 4 and FIG. 6 showing an additional pipe 13-2-3 from the parallel compressor path.

Each of FIGS. 1-6 shows a second-stage vapor condensed product B that passes via pipe 15 such that a portion of the liquid may be split between a finished product and passing via pipe 16 to the third process stage vessel 17.

FIG. 5 and FIG. 6 each have an additional split of the condensate from exchanger 14 passing liquid back to the thermal vapor compressor driver heater 13-1-5 that produces motive vapors to drive the thermal compressor via pipe 13-1-4 with the generated vapors passing via pipe 13-1-6 to thermal vapor compressor 13-1-1, and in the case of FIG. 6, also driving the parallel thermal vapor compressor 13-2-1 with thermal vapor compressor 13-1-1 driven from thermal vapor compressor 13-2-1 via pipe 13-2-6.

Each of FIGS. 1-6 shows the third stage vessel 17 being driven by vapors from pipe 18. FIG. 1 shows the third stage vessel 17 driven by vapors via pipe 18 from vaporizer 2 via pipe 3. FIGS. 2-6 each show vessel 17 driven by vapors via pipe 18 where the liquid precursor is passed via pipe 1-18 to heat exchanger 14 where the liquid is vaporized and passed via pipe 18 to vessel 17. Each of FIGS. 1-6 shows vapors from the third stage vessel 17 passing via pipe 18. FIG. 1 shows the vapors from pipe 19 passing to condenser 20, whereas FIG. 2 shows the vapors from pipe 18 passing to heat exchanger 20. FIG. 3 and FIG. 4 show pipe 19 passing vapors to mechanical compressor 19-1-1 and, in FIG. 4, additional mechanical compressor 19-2-1. FIG. 5 and FIG. 6 each pass vapors to thermal compressor 19-1-1. In FIG. 4. additional pipe 19-2-2 passes compressed vapors to heat exchanger 20. In FIG. 6, additional thermal compressor 19-2-1 passes vapors to pipe 19-1-2. Each of FIGS. 3-6 shows pipe 19-1-3 providing the option to pass a portion of the vapors to the next process stage, with FIG. 4 and FIG. 6 showing an additional pipe 19-2-3 from the parallel compressor path.

Each of FIGS. 1-6 shows the third-stage vapor condensed product C that passes via pipe 21 where a portion of the liquid may be balanced between a finished product and passes via pipe 22 to the fourth process stage vessel 23.

FIG. 5 and FIG. 6 each show an additional portion of the condensate from exchanger 20 passing liquid back to the thermal vapor compressor driver heater 19-1-5 which produces motive vapors to drive the thermal compressor via pipe 19-1-4 with the generated vapors passing via pipe 19-1-6 to thermal vapor compressor 19-1-1 and, in FIG. 6, also driving the parallel thermal vapor compressor 19-2-1 with thermal vapor compressor 19-1-1 driven from thermal vapor compressor 19-2-1 via pipe 19-2-6.

Each of FIGS. 1-6 shows the fourth stage vessel 23 being driven by vapors from pipe 24. FIG. 1 shows the fourth stage vessel 23 driven by vapors via pipe 24 from the vaporizer 2 via pipe 3. FIGS. 2-6 each show vessel 23 driven by vapors via pipe 24 where the liquid precursor passes via pipe 1-24 to heat exchanger 20 where the liquid is vaporized and passed via pipe 24 to vessel 23. Each of FIGS. 1-6 shows vapors from the fourth stage vessel 23 passing via pipe 25. Each of FIGS. 1-6 also shows the vapors from pipe 25 passing to condenser 26 to pass the product D via pipe 27. The fourth product D may be balanced in any of FIGS. 3-6 with the vapors from pipe 25 passing to mechanical compressor 25-1-1 in FIG. 3 and FIG. 4, or to thermal compressor 25-1-1 in FIG. 5 and FIG. 6, or to additional mechanical compressor 25-2-1 in FIG. 4, or to additional thermal compressor 25-2-1 in FIG. 6, or to pipe 25-1-2 in FIG. 4 or 6, and/or to additional pipe 25-2-2 in FIG. 6 passing compressed vapors to heat exchanger 28, with the condensed product passing via pipe 29 as product D, and the heat from the fourth process stage passing to vaporize the precursor liquid passed via pipe 1-30 in heat exchanger 28 with the vapors passing via pipe 30 and the vapors passing back to drive the process stages for the total process. FIGS. 3-6 each show pipe 25-1-3 providing the option to pass a portion of the vapors to the next process stage, with FIG. 4 and FIG. 6 showing an additional pipe 25-2-3 from a parallel compressor path.

FIG. 5 and FIG. 6 show an additional portion of the condensate from exchanger 28 passing liquid back to the thermal vapor compressor driver heater 25-1-5, producing motive vapors to drive the thermal compressor via pipe 25-1-4 with the generated vapors passing via pipe 25-1-6 to thermal vapor compressor 25-1-1, and in FIG. 6 also driving the parallel thermal vapor compressor 25-2-1 with thermal vapor compressor 25-1-1 driven from thermal vapor compressor 25-2-1 via pipe 25-2-6.

FIG. 7 and FIG. 8 show mechanical vapor compression, and FIG. 9 and FIG. 10 show thermal vapor compression, where compressed-output controlling valves channel the flow of portions of the vapors to pass process heat either back to the process stage from whence it comes by a reboiler and/or the remaining balance of flow, as all or a portion of the vapors, passes on to other integrated process stages. FIG. 8 and FIG. 10 show a complex organization of compressors in which control valves channel the compressed output vapors that may pass, in series and/or in parallel, to the process stages, giving greater options for a combination of paths for the vapor flow to be shared over the total process stages.

FIG. 7 is a schematic drawing showing a multistage process wherein the vapors from each stage are mechanically compressed to a pressure such that the condensing temperature is increased to a point that permits the heat of vaporization to be passed, via a heat exchanger, back to the sourcing process stage and/or to the next process stage. The multiple mechanical compressors within the multiple process stages form a series flow of vapors, controlled by valves, passing through the multistage process. The final process stage in the multistage process, controlled by valves, may pass a portion of the vapors to a final condenser to balance the total process heat flow, optionally discarding that portion of vapors not returned to the process stages.

FIG. 8 is a schematic drawing showing multistage processing wherein the vapors from each stage are mechanically compressed and controlled by valves by multiple compressors in a parallel and serial configuration, to a pressure that permits the heat of vaporization to be passed, via a heat exchanger, back to the process stage and/or to the next process stage. The multiple parallel mechanical compressors controlled by valves allow for greater variance in the flow from each stage, where the amount of vapor moved within a single stage and the amount of vapor exchanged between process stages may be selected with greater control. The multiple compressors within single process stages and across multiple process stages form a network of series and parallel flows of vapors using control valves through the multistage process. The ability to control the flow by the valves with the parallel legs provides a broader operating range, accommodating higher mass flow variability. The final process stage in the multistage process may pass a portion of the vapors, via the control valves, to a final condenser to balance the total process heat flow.

FIG. 9 is a schematic drawing showing a multistage process wherein the vapors from each stage are thermally compressed to a pressure such that the condensing temperature is increased to a point that permits the heat of vaporization to be passed, via a heat exchanger, back to the sourcing process stage and/or to the next process stage(s). The multiple thermal compressors within the multiple process stages form a series flow of vapors, controlled by valves, through the multiple stage process. The final process stage in the multistage process, controlled by valves, may pass a portion of the vapors to a final condenser to balance the total process heat flow.

FIG. 10 is a schematic drawing showing a multistage process wherein the vapors from each stage are thermally compressed by multiple compressors in a networked parallel and serial configuration, to a level that permits the heat of vaporization to be passed, via a heat exchanger, back to the sourcing process stage and/or to the next process stage. The multiple parallel thermal compressors allow for greater variance by control valves in the flow from each stage, where the amount of vapor moved within a single stage and the amount of vapor exchanged between process stages may be selected with greater control. The multiple compressors within single process stages and across the multiple process stages form a network of series and parallel flows of vapors with mass flow varied by control valves through the multistage process. The ability to control the parallel legs by the control valves provides a broader operating range, accommodating higher mass flow variability. The final process stage in the multistage process, as modulated by control valve(s), may pass a portion of the vapors to a final condenser to balance the total process heat flow.

The invention in some embodiments is shown in FIG. 7, FIG. 8, FIG. 9, and FIG. 10 having a similar organization of stages and product flow, describing a process path starting with a precursor feedstock as a raw material comprised of natural products, petroleum or a petroleum chemical fraction, wherein the liquid effluent flows via pipe 1 with the mixture of components passing to the initial fuel burning heater vaporizer 2 where the precursor is vaporized. The vaporized mixture passes via pipe 3 to a manifold, then to several process stages, wherein the first manifold is pipe 4 passing to reaction vessel 5 into which reagent reactants are added via pipe 6. Reaction vessel 5 may consist of, for example, an oxidation, reduction, molecular fracking, or reformation process. The resulting product mixture from the reaction process stage in vessel 5 passes to a condenser 8 via pipe 7 in FIG. 7, FIG. 8, FIG. 9 and FIG. 10.

FIG. 7 and FIG. 8 show a mechanical compressor 7-1-1 and FIG. 9 and FIG. 10 show a thermal compressor 7-1-1 that compress the vapors from vessel 5 via pipe 7 to a pressure above the condensing conditions in heat exchanger 8, allowing vessel 5 to have a lower pressure and temperature while compressor 7-1-1 achieves a sufficiently high pressure to allow the vapors in pipe 7-1-2 to condense in heat exchanger 8. FIG. 7, FIG. 8, FIG. 9 and FIG. 10 depict control valves 7-1-2-1 and 7-1-3-1, on the high-pressure side of compressor 7-1-1, wherein the vapor control can be balanced to pass compressed vapors back to the heat exchanger 8 as the sourcing process stage or on to the subsequent process stages. FIG. 8 and FIG. 10 have the same compression loop described in FIG. 7 and FIG. 9 via compressor 7-1-1 while having an additional parallel compressor 7-2-1, with control valves, on the high-pressure side of the parallel compressor 7-2-1 (FIG. 8 incorporates a mechanical vapor compressor and FIG. 10 incorporates a thermal vapor compressor). FIG. 8 and FIG. 10 show the compressed vapors being controlled by valves 7-2-2-1 and 7-2-3-1 for balancing vapors between heat exchanger 8, wherein heat is returned to the source process stage and/or heat is passed on to the next process stages via pipe 13.

FIG. 8 and FIG. 10 show a compressor 7-1-1 that passes vapors parallel to compressor 7-2-1, moving compressed vapors which are balanced and distributed between vessel 5 and heat exchanger 8 via pipe 7-1-2 and compressor 13-1-1 via pipe 7-1-3. The compressed vapors are controlled via the parallel valves 7-1-2-1/7-1-3-1 and 7-2-2-1/7-2-3-1 as in FIG. 8, and FIG. 10 allows for varying the amount of vapor product A to be condensed in heat exchanger 8 with the balance passing on to the second stage, compressor 13-1-1/13-2-1, via pipe 13. FIG. 8 and FIG. 10 have a parallel compressor 7-1-1 similar to FIG. 7 and FIG. 9 with the same conditions for recompressing vapors in heat exchanger 8. An additional compressor 7-2-1 is configured parallel to compressor 7-1-1 to allow greater variance in flow when the two compressors are operated at differing speeds. There are parallel control valves 7-1-2-1/7-1-3-1 and 7-2-2-1/7-2-3-1.

FIG. 9 and FIG. 10 show a portion of the liquid condensate from exchanger 8 passing back to the thermal vapor compressor driver heater 7-1-5 to produce motive vapors to drive the thermal compressor via pipe 7-1-4, with the generated vapors passing via pipe 7-1-6 to thermal vapor compressor 7-1-1, and in FIG. 10 also driving the parallel thermal vapor compressor 7-2-1 with thermal vapor compressor 7-1-1 driven from thermal vapor compressor 7-2-1 via pipe 7-2-6.

In each of FIG. 7, FIG. 8, FIG. 9, and FIG. 10, the vapors from vessel 5 pass via pipe 7 to be condensed in condenser 8. The liquid condensate passes via pipe 9, with a portion of product A passing out of the system or passing via pipe 10 to vessel 11.

FIG. 7, FIG. 8, FIG. 9, and FIG. 10 show vessel 11 driven by vapors via pipe 12 where the liquid precursor passes via pipe 1-12 to heat exchanger 8 wherein the liquid is vaporized and passed via pipe 12 to vessel 11. FIG. 7, FIG. 8, FIG. 9, and FIG. 10 show vapors from the second stage vessel 11 passing via pipe 13. FIG. 7 and FIG. 8 show pipe 13 passing to mechanical compressor 13-1-1 and FIG. 9 and FIG. 10 show pipe 13 passing to thermal compressor 13-1-1. FIG. 8 shows an additional mechanical compressor 13-2-1 and FIG. 10 shows an additional thermal compressor 13-2-1 to pipe 13-1-2. FIG. 8 and FIG. 10 show an additional pipe 13-2-2 passing compressed vapors to heat exchanger 14 via pipe 13-1-2. FIG. 8 and FIG. 10 show pipe 13-1-3 providing the option to pass a portion of the vapors to the next process stage and an additional pipe 13-2-3 from the parallel compressor path.

FIG. 7, FIG. 8, FIG. 9 and FIG. 10 show a second-stage vapor condensed product B that passes via pipe 15 such that a portion of the liquid may be split between a finished product and passing via pipe 16 to the third process stage vessel 17.

FIG. 9 and FIG. 10 show an additional split of the condensate from exchanger 14 passing liquid back to the thermal vapor compressor driver heater 13-1-5 that produces motive vapors to drive the thermal compressor via pipe 13-1-4 with the generated vapors passing via pipe 13-1-6 to thermal vapor compressor 13-1-1, and in FIG. 10 also driving the parallel thermal vapor compressor 13-2-1 with thermal vapor compressor 13-1-1 driven from thermal vapor compressor 13-2-1 via pipe 13-2-6.

FIG. 7, FIG. 8, FIG. 9 and FIG. 10 show the vapors raised from vessel 14 passing by pipe 18 back to drive prior vapor sourcing process stages. FIG. 7, FIG. 8, FIG. 9, and FIG. 10 show heat exchanger 14 wherein the liquid is vaporized and passed via pipe 18, moving the generated vapors back to the sourcing process vessel 11 and vessel 5 via pipe 18. FIG. 7 and FIG. 8 show the vapors from pipe 19-1-2-2 passing to heat exchanger 20, while FIG. 8 and FIG. 10 show pipe 19-2-2-2 passing vapors to heat exchanger 20. FIG. 7 has a mechanical compressor 19-1-1 while FIG. 8 has an additional mechanical compressor 19-2-1; FIG. 9 has thermal compressor 19-1-1 while FIG. 10 has an additional thermal compressor 19-2-1. FIG. 7, FIG. 8, FIG. 9, and FIG. 10 pass compressed vapors via pipe 19-1-2 with the parallel compressors in FIG. 8 and FIG. 10 via additional pipe 19-2-2 passing compressed vapors to heat exchanger 20, wherein the balance of vapors controlled by valves 19-1-2-1 and 19-1-3-1 pass the compressed vapors back to the sourcing process stage via heat exchanger 20 or to the condenser 24. FIG. 8 and FIG. 10 show the parallel compressor 19-2-2 passing vapors via pipe 19-1-3 controlled by valve 19-1-3-1 via pipe 19-1-3-2, thereby providing the option to pass a portion of the vapors to the condenser 24.

It should be noted that regarding the process-flow diagrams, specific unit operations may be omitted in some embodiments and in these or other embodiments, other unit operations not explicitly shown may be included. Various valves, pumps, meters, sensors, sample ports, etc. are not shown in these block-flow diagrams. Additionally, multiple pieces of equipment, either in series or in parallel, may be utilized for any unit operations. Also, solid, liquid, and gas streams produced or existing within the process may be independently recycled, passed to subsequent steps, or removed/purged from the process at any point.

In various embodiments relating specifically to biorefineries, a starting biomass feedstock may be selected from agricultural crops and/or agricultural residues. In some embodiments, agricultural crops are selected from starch-containing feedstocks, such as corn, wheat, cassava, rice, potato, millet, sorghum, or combinations thereof. In some embodiments, agricultural crops are selected from sucrose-containing feedstocks, such as sugarcane, sugar beets, or combinations thereof. Lignocellulosic biomass may also be used as the biomass feedstock. Lignocellulosic biomass includes, for example, plant and plant-derived material, vegetation, agricultural waste, forestry waste, wood waste, paper waste, animal-derived waste, poultry-derived waste, and municipal solid waste.

Some embodiments incorporate a process-control sub-system configured for automatically controlling a vapor-processing unit and a vapor compression sub-system. The process-control sub-system may utilize artificial intelligence, such as one or more machine-learning algorithms, one or more deep-learning algorithms, one or more neural networks, or a combination thereof.

The throughput, or process capacity, may vary widely from small laboratory-scale units to full commercial-scale refineries, including any pilot, demonstration, or semi-commercial scale systems. In various embodiments, the process capacity is at least about 1 kg/day, 10 kg/day, 100 kg/day, 1 ton/day (all tons are metric tons), 10 tons/day, 100 tons/day, 1000 tons/day, 10000 tons/day, or higher.

The refinery may be a retrofit to an existing plant. In other embodiments, the refinery is a greenfield plant. Some embodiments employ a mechanical vapor compression system along with a standard thermally driven process in the original system to capture synergies. Some embodiments provide a retrofit or augmentation of a standard refinery (which may be a greenfield refinery or an existing refinery) with an integrated mechanical vapor compression system. The retrofit may provide the option of diverting vapors (of a standard thermally driven process) into a mechanical or thermal vapor compression system integrated into the refinery.

As will be appreciated by a person of ordinary skill in the art, the principles of this disclosure may be applied to many refinery or industrial-plant configurations beyond those explicitly disclosed or described in the drawings hereto. Various combinations are possible and selected embodiments from some variations may be utilized or adapted to arrive at additional variations that do not necessarily include all features disclosed herein.

In this detailed description, reference has been made to multiple embodiments of the invention and non-limiting examples and drawings relating to how the invention can be understood and practiced. Other embodiments that do not provide all of the features and advantages set forth herein may be utilized, without departing from the spirit and scope of the present invention. This invention incorporates routine experimentation and optimization of the methods and systems described herein. Such modifications and variations are considered to be within the scope of the invention defined by the claims.

All publications, patents, and patent applications cited in this specification are incorporated herein by reference in their entirety as if each publication, patent, or patent application was specifically and individually put forth herein. This specification hereby incorporates by reference commonly owned U.S. Pat. No. 9,925,476, issued Mar. 27, 2018, and U.S. Pat. No. 9,925,477, issued Mar. 27, 2018, and U.S. patent application Ser. No. 15/711,699 filed Sep. 21, 2017 (published on Feb. 1, 2018 as U.S. Patent App. Pub. No. 2018/0028934 A1).

Where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process, when possible, as well as performed sequentially.

Therefore, to the extent that there are variations of the invention which are within the spirit of the disclosure or equivalent to the inventions found in the appended claims, it is the intent that this patent will cover those variations as well. The present invention shall only be limited by what is claimed.

The present invention is not a single vapor-processing unit for a single process stage, wherein the single vapor-processing unit has one, uninterrupted compression stream with no branches to other process stages or other processes.

What is claimed is:

1. A multiple-stage, energy-integrated process comprising:
   (a) providing a plurality of process stages collectively configured for continuously or semi-continuously converting a feedstock into one or more products, wherein said plurality of process stages utilizes vapor-liquid phase changes;
   (b) providing a vapor-compression system, wherein said vapor-compression system includes at least a first vapor compressor and a second vapor compressor, wherein said first vapor compressor is a mechanical vapor compressor or a thermal vapor compressor, and wherein said second vapor compressor is a mechanical vapor compressor or a thermal vapor compressor;
   (c) sequentially arranging said first and second vapor compressors to increase pressure and condensing temperature of first vapors within a first process stage and second vapors within a second process stage that is downstream of, and thermally integrated with, said first process stage, thereby providing compressed first vapors and compressed second vapors;
   (d) directing at least a portion of said compressed first vapors to (i) said second process stage, (ii) a process stage, if any, that is downstream of said second process stage, (iii) a process stage, if any, that is upstream of said first stage, or (iv) combinations thereof;
   (e) optionally, directing at least a portion of said compressed second vapors to (i) said first process stage, (ii) a process stage, if any, that is upstream of said first stage, (iii) a process stage, if any, that is downstream of said second process stage, or (iv) combinations thereof;
   (f) optionally, directing a portion of said compressed first vapors back to said first process stage; and
   (g) optionally, directing at least a portion of said compressed second vapors back to said second process stage.

2. The multiple-stage, energy-integrated process of claim 1, wherein said feedstock includes fossil hydrocarbons, renewable bio-based natural substrates, or a combination thereof.

3. The multiple-stage, energy-integrated process of claim 1, wherein at least one of steps (e), (f), and (g) are conducted.

4. The multiple-stage, energy-integrated process of claim 1, wherein at least two of steps (e), (f), and (g) are conducted.

5. The multiple-stage, energy-integrated process of claim 1, wherein steps (e), (f), and (g) are all conducted.

6. The multiple-stage, energy-integrated process of claim 1, wherein said plurality of process stages is at least three process stages.

7. The multiple-stage, energy-integrated process of claim 1, wherein at least one of said first process stage or said second process stage is selected from distillation, evaporation, stripping, molecular-sieve treatment, chemical reaction, and combinations thereof.

8. The multiple-stage, energy-integrated process of claim 7, wherein said chemical reaction is selected from the group consisting of oxidation, reduction, hydrolysis, condensation, transesterification, oligomerization, polymerization, crystallization, isomerization, reforming, cracking, dehydrosulfurization, hydrotreating, alkylation, hydrogenation, dehydrogenation, dehydration (olefin formation), cyclicization, coking, catalyst regeneration, and combinations thereof.

9. The multiple-stage, energy-integrated process of claim 1, wherein a third vapor compressor is configured to compress a heat-exchange medium that is out-of-contact with third vapors within a third process stage, and wherein said third vapor compressor is a mechanical vapor compressor or a thermal vapor compressor.

10. The multiple-stage, energy-integrated process of claim 1, wherein said multiple-stage, energy-integrated process is conducted in a biorefinery, a petroleum refinery, a chemical plant, a petrochemical plant, a biochemical plant, a natural gas refinery, a shale oil refinery, a coal-derived product refinery, or a syngas-derived product plant.

* * * * *